(12) United States Patent
Suzuki et al.

(10) Patent No.: US 7,708,323 B2
(45) Date of Patent: May 4, 2010

(54) CRUSHABLE BODY STRENGTH ADJUSTING DEVICE FOR A VEHICLE

(75) Inventors: Shunji Suzuki, Saitama (JP); Yuta Urushiyama, Saitama (JP); Yasuaki Gunji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 276 days.

(21) Appl. No.: 12/009,614

(22) Filed: Jan. 21, 2008

(65) Prior Publication Data
US 2008/0185852 A1    Aug. 7, 2008

(30) Foreign Application Priority Data

| Feb. 5, 2007 | (JP) | ............................. 2007-025845 |
| Feb. 5, 2007 | (JP) | ............................. 2007-025846 |
| Feb. 5, 2007 | (JP) | ............................. 2007-025848 |
| Sep. 4, 2007 | (JP) | ............................. 2007-229505 |

(51) Int. Cl.
*B60R 19/18* (2006.01)

(52) U.S. Cl. ...................................... 293/132; 293/102

(58) Field of Classification Search .................. 293/102, 293/132, 133, 135, 136
See application file for complete search history.

(56) References Cited

U.S. PATENT DOCUMENTS 7,195,305 B2    3/2007    Urushiyama et al.

2005/0104391 A1*   5/2005   Browne et al. .............. 293/132
2005/0264037 A1*  12/2005   Urushiyama et al. ........ 293/132

FOREIGN PATENT DOCUMENTS

JP        2006-008106        1/2006

* cited by examiner

*Primary Examiner*—Lori L Lyjak
(74) *Attorney, Agent, or Firm*—Carrier, Blackman & Associates P.C.; William D. Blackman; Joseph P. Carrier

(57) ABSTRACT

A vehicle body strength adjusting system is provided in which a bumper beam includes a body portion which extends in a widthwise direction of a vehicle and inclined portions which extend from left and right opposite ends of the body portion and which are inclined in a longitudinal direction of the vehicle body. Further, the vehicle body strength adjusting system includes a variable crush-strength device which is disposed between the inclined portions of the vehicle body frames, which can be crushed when a collision with the vehicle occurs, and which has a variable crush-strength. A first bolt hole is formed in each of the inclined portions of the bumper beam and a second bolt hole is formed in the mounting bracket of the variable crush-strength device. At least one of the first bolt hole and the second bolt hole is an elongate hole. The first bolt hole and the second bolt hole are fastened to each other by a bolt.

17 Claims, 23 Drawing Sheets

HIGH-LOAD MODE

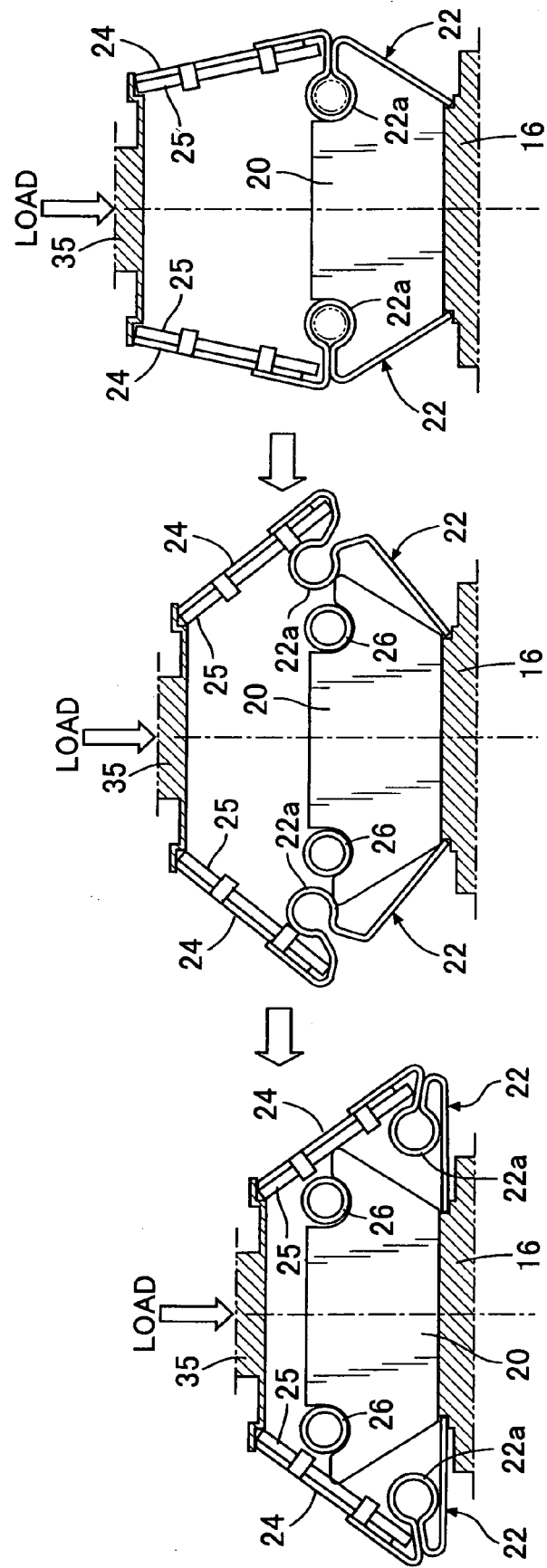

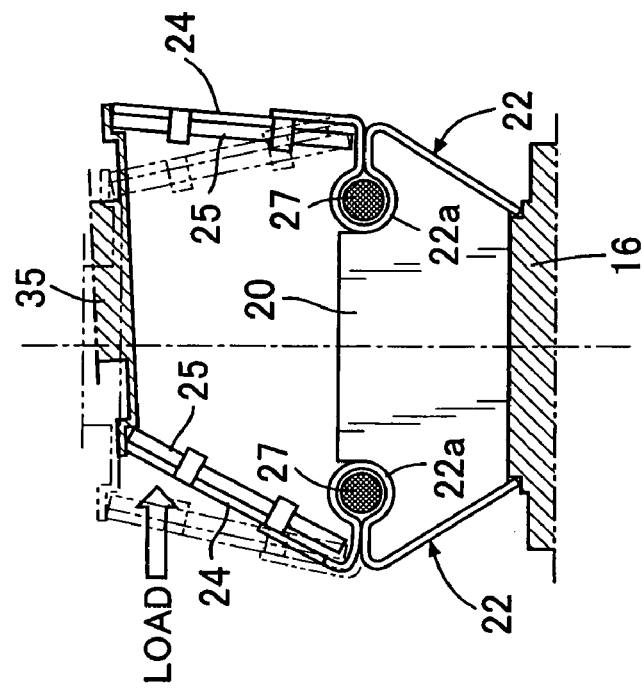
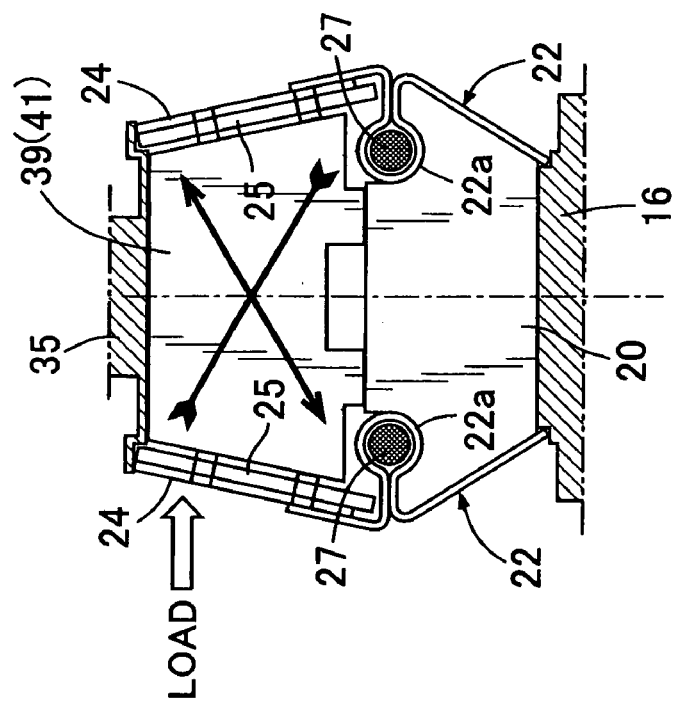

CRUSHABLE BODY STRENGTH ADJUSTING DEVICE FOR A VEHICLE

CROSS-REFERENCE TO RELATED APPLICATIONS

The present invention claims priority under 35 USC §119 based on Japanese patent application numbers 2007-25845 filed 5 Feb. 2007, 2007-25846 filed 5 Feb. 2007, 2007-25848 filed 5 Feb. 2007 and 2007-229505 filed 4 Sep. 2007. The subject matter of these priority documents are incorporated by reference herein.

BACKGROUND OF THE INVENTION

1. Field of the Invention

The present invention relates to a crushable body strength adjusting system in a vehicle, comprising a device which is disposed between a bumper beam and a vehicle body frame, can be crushed upon reception of a collision load in the longitudinal direction of the vehicle body, and has a variable crush-strength.

2. Description of the Related Art

Japanese Patent Application Laid-open No. 2006-8106 discloses a vehicle body strength adjusting system comprising: a bumper beam mounted at front ends of front side frames of an automobile, the bumper beam including a pair of front and rear beam members disposed parallel to each other; and a plurality of variable crush-strength devices disposed at equal distances between the beam members.

Each of the variable crush-strength devices includes: a plurality of buckling plates made of shape memory alloy and disposed adjacent to one another such that they are buckled by a collision shock; and an actuator which switches over the buckling plates between a state in which they are integrally connected to each other and a state in which they are separated from each other. In the state in which the buckling plates are integrally connected to each other, the buckling strength is increased in order to increase the absorbable shock energy. In the state in which the buckling plates are separated from each other, the buckling strength is decreased in order to decrease the absorbable shock energy.

In general, the bumper beam has a shape such that its left and right opposite ends are inclined to extend around along sides of a vehicle body. Therefore, in a system in which inclined left and right ends of a bumper beam are supported at front ends of left and right front side frames by variable crush-strength devices interposed therebetween, when a frontal collision load is input to the bumper beam, the inclined left and right ends are deformed so as to extend straight, whereby the lateral length of the bumper beam is increased. Thus, the variable crush-strength devices fall down and are inclined outward of the vehicle body, leading to a possibility that the collision load being input from the front cannot be effectively absorbed.

In the case where a load acting in a longitudinal direction of the vehicle body is input to the bumper beam upon frontal collision of a vehicle, the buckling plates of the variable crush-strength devices are buckled without laterally falling down, thereby exhibiting a shock-absorbing effect. However, in the case where a load acting in a direction inclined with respect to the longitudinal direction of the vehicle body is input to the bumper beam upon diagonal collision of a vehicle, the buckling plates of the variable crush-strength devices fall down in right and left directions without being buckled, leading to a possibility that a sufficient shock-absorbing effect cannot be exhibited.

In order to effectively absorb a load collision on the vehicle, it is desirable to maintain a high load level for a period from the beginning to the end of the crushing of the buckling plates. However, if a buckling plate is formed of an iron material or an aluminum material, the load steeply increases with an increase in the amount of deformation of the buckling plate to reach a peak and then gradually decreases, leading to a difficulty in maintaining a constantly high load level. On the other hand, if a buckling plate is formed of shape memory alloy, the load steeply increases with an increase in the amount of deformation of the buckling plate to reach a peak and then steeply decreases to reach a bottom, and further gradually increases from the bottom, also leading to a difficulty in maintaining a constantly high load level.

SUMMARY OF THE INVENTION

The present invention has been accomplished with the above circumstance in view, and it is a first object of the present invention to prevent a lateral force in a widthwise direction of a vehicle from being input to a variable crush-strength device when a collision load is applied to a bumper beam in a longitudinal direction of a vehicle body, whereby the variable crush-strength device is efficiently crushed to enhance a shock-absorbing effect.

It is a second object of the present invention to prevent a buckling plate of a variable crush-strength device from falling down when a collision load in a diagonal direction is applied to a bumper beam, thereby reliably exhibiting a shock-absorbing effect.

It is a third object of the present invention to maximize a shock-absorbing effect of a buckling plate of a variable crush-strength device when the buckling plate is buckled upon collision of a vehicle.

To achieve the first object, according to a first aspect of the present invention, there is provided a vehicle body strength adjusting system in a vehicle, comprising: a bumper beam including a body portion extending in a widthwise direction of a vehicle and inclined portions extending from left and right opposite ends of the body portion and inclined in a longitudinal direction of a vehicle body; variable crush-strength devices which are disposed between the inclined portions and left and right vehicle body frames, can be crushed upon receiving a collision load in the longitudinal direction of the vehicle body, and have a variable crush-strength; wherein a first bolt hole is formed in each inclined portion of the bumper beam, a second bolt hole is formed in a mounting bracket of each variable crush-strength device, and at least one of the first bolt hole and the second bolt hole which is elongate in the widthwise direction of the vehicle; and bolts which extend through the first and second bolt holes to fasten the bumper beam to the variable crush-strength devices.

With this arrangement, when a collision load is input to the bumper beam, the body portion and the inclined portions provided at opposite ends of the body portion are caused to rectilinearly extend to increase the length of the bumper beam in the widthwise direction of the vehicle. Therefore, a lateral force in a widthwise outward direction of a vehicle acts on the mounting brackets of the variable crush-strength devices connected to the inclined portions of the bumper beam, which normally might lead to a possibility that the variable crush-strength devices fall down and do not fully receive the collision load in the longitudinal direction. However, because at least one of the first bolt holes formed in the inclined portions of the bumper beam and the second bolt holes formed in the mounting brackets for the variable crush-strength devices is elongate in the widthwise direction of the vehicle, and the fastening bolts extend through the first and second bolt holes, the lateral force acting in the widthwise outward direction can be absorbed by sliding movement between the elongate hole and the bolt to prevent the falling-down of the variable crush-strength device, and the collision load acting in the longitudinal direction of the vehicle body can be input to the variable crush-strength device from the front to reliably crush the variable crush-strength device, thereby maximizing the shock-absorbing effect. The term "bolts" is used herein as a generic example of a device to fasten the bumper beam to the variable crush-strength devices and that "bolts" is meant to encompass any type of appropriate fastener.

According to a second aspect of the present invention, in addition to the first aspect, the first bolt hole is elongate and disposed within a horizontal plane, and an angle formed by the elongate hole with respect to a direction of extension of the body portion of the bumper beam is larger than an angle formed by the inclined portion of the bumper beam with respect to a direction of extension of the body portion.

With this arrangement, the angle formed by the elongate hole forming the first bolt hole formed within the horizontal plane of the inclined portion of the bumper beam with respect to the direction of extension of the body portion is set to be larger than the angle formed by the inclined portion of the bumper beam with respect to the direction of extension of the body portion. Therefore, even if the inclined portion is deformed by the collision load thereby forming a straight line along with the body portion, the direction of the elongate hole can be still maintained in a state inclined with respect to the widthwise direction of the vehicle. Thus, the collision load applied in the longitudinal direction of the vehicle body allows the elongate hole to smoothly slide relative to the bolt, thereby reliably preventing the falling-down of the variable crush-strength device.

According to a third aspect of the present invention, in addition to the second aspect, an angle formed by the elongate hole with respect to the direction of extension of the inclined portion of the bumper beam is equal to the angle formed by the inclined portion of the bumper beam with respect to the direction of extension of the body portion.

With this arrangement, the angle formed by the elongate hole with respect to the direction of extension of the inclined portion of the bumper beam is set to be equal to the angle formed by the inclined portion of the bumper beam with respect to the direction of extension of the body portion. Therefore, even if the inclined portion is deformed by the collision load to form a straight line along with the body portion, the direction of the elongate hole can be still maintained in a state in which it is inclined at an angle, which is the angle of inclination of the inclined portion before the collision, with respect to the widthwise direction of the vehicle. Thus, it is possible to further reliably prevent the falling-down of the variable crush-strength device.

To achieve the second object of the present invention, according to a fourth aspect of the present invention, there is provided a vehicle body strength adjusting system in a vehicle, comprising a variable crush-strength device which is disposed between a bumper beam and a vehicle body frame, can be crushed upon reception of a collision load in the longitudinal direction of the vehicle body, and has a variable crush-strength, wherein the variable crush-strength device includes: a buckling plate which is buckled by a load input in the longitudinal direction of the vehicle body to absorb a shock; and a falling prevention plate for preventing falling-down of the buckling plate due to a load input in a direction inclined with respect to the longitudinal direction of the vehicle body.

With this arrangement, the variable crush-strength device disposed between the bumper beam and the vehicle body frame includes the buckling plate which is buckled by a load input in the longitudinal direction of the vehicle body to absorb a shock, and a falling prevention plate for preventing the falling-down of the buckling plate due to the load input in a direction inclined with respect to the longitudinal direction of the vehicle body. Therefore, even when a load is input in a direction inclined with respect to the longitudinal direction of the vehicle body, the falling prevention plate prevents the buckling plate from falling down so that the buckling plate can be reliably buckled by a component of the load in the longitudinal direction of the vehicle body, thereby exhibiting a shock-absorbing effect.

According to a fifth aspect of the present invention, in addition to the fourth aspect, the falling prevention plate is formed such that a buckling rigidity against the load input in the direction inclined with respect to the longitudinal direction of the vehicle body is larger than a buckling rigidity against the load input in the longitudinal direction of the vehicle body.

With this arrangement, the buckling rigidity of the falling prevention plate against the load input in the direction inclined with respect to the longitudinal direction of the vehicle body is set to be larger than the buckling rigidity of the falling prevention plate against the load input in the longitudinal direction of the vehicle body. Therefore, when a load is input in the longitudinal direction of the vehicle body, the falling prevention plate is easily buckled without affecting the buckling characteristic of the buckling plate. Also, when a load is input in the direction inclined with respect to the longitudinal direction of the vehicle body, it is difficult to buckle the falling prevention plate to prevent the falling-down of the buckling plate, whereby the buckling plate can be reliably buckled to exhibit a sufficient shock-absorbing performance.

To achieve the third object of the present invention, according to a sixth aspect of the present invention, there is provided a vehicle body strength adjusting system in a vehicle, comprising a variable crush-strength device which is disposed between a bumper beam and a vehicle body frame, can be crushed upon reception of a collision load in the longitudinal direction of the vehicle body, and has a variable crush-strength, wherein the variable crush-strength device includes a first buckling plate and a second buckling plate which are superposed on each other such that they are integrally buckled by the collision load; and wherein the second buckling plate is formed of shape memory alloy, and the first buckling plate is formed of a material other than shape memory alloy.

With this arrangement, which the first and second buckling plates which are superposed on each other such that they are integrally buckled with each other by the collision load, the second buckling plate is formed from shape memory alloy which has a characteristic such that the load increases with an increase in displacement amount in a region excluding an initial stage of the deformation, and the first buckling plate is formed of a material other than shape memory alloy which material has a characteristic such that the load decreases with an increase in displacement amount in the region excluding the initial stage of the deformation. Therefore, in the process of collision, a sum of the loads on the first and second buckling plates can be maintained at a substantially constant high value, thereby maximizing the shock-absorbing effect of the variable crush-strength device.

According to a seventh aspect of the present invention, in addition to the sixth aspect, the first and second buckling plates have different lengths in the longitudinal direction of the vehicle body.

With this arrangement, the first and second buckling plates have different lengths in the longitudinal direction of the vehicle body, and thus there is a difference in timing between generation of a load due to compression of the first buckling plate and generation of a load due to compression of the second buckling plate, such that a sum of the loads on the first and second buckling plates can approximate a constant value with a good accuracy.

According to an eighth aspect of the present invention, in addition to the sixth or seventh aspect, the second buckling plate is integrally fixed to the first buckling plate by folding a fixing claw formed on the first buckling plate.

With this arrangement, the second buckling plate is integrally fixed to the second bucking plate by folding the fixing claw formed on the first buckling plate. Therefore, the first and second bucking plates can be made integral to each other without a special processing of the second buckling plate made of shape memory alloy which is difficult to be processed.

Front side frames 12 in disclosed present exemplary embodiments correspond to the vehicle body frame of the present invention; first and second buckling plates 24 and 25 in the exemplary embodiments corresponds to the buckling plates of the present invention; and first and second falling prevention plates 39, 39A, 39B, 41 in the exemplary embodiments corresponds to the falling prevention plate of the present invention.

The above-mentioned object, other objects, characteristics, and advantages of the present invention will become apparent from the present exemplary embodiments, which will be described in detail below by reference to the attached drawings.

BRIEF DESCRIPTION OF THE DRAWINGS

FIGS. 1 to 13 show a first exemplary embodiment of the present invention wherein FIG. 1 is a plan view of a front portion of a vehicle body of a vehicle including a pair of crushable body strength adjusting devices;

FIG. 2 is an enlarged view of an encircled portion 2 in FIG. 1;

FIG. 3 is a perspective view of a variable crush-strength device;

FIG. 4 is an exploded perspective view of the variable crush-strength device;

FIG. 5 is a sectional view taken along a line 5-5 in FIG. 2;

FIG. 6 is a sectional view taken along a line 6-6 FIG. 5;

FIG. 7 is a sectional view taken along a line 7-7 in FIG. 2;

FIG. 8 is an exploded view taken in a direction of an arrow 8 in FIG. 2;

FIGS. 10A to 10C are views for explaining the operation of the variable crush-strength device in a low-load mode;

FIGS. 11A and 11B are views for explaining the operation of first and second falling prevention plates;

FIG. 12 is a diagram for explaining the operation when the first and second buckling plates are buckled; and FIG. 13 is a view for explaining the operation when a bumper beam is deformed in an elongated manner upon the collision of a vehicle.

FIGS. 16 to 18 show a fourth exemplary embodiment of the present invention wherein FIG. 16 is an exploded view similar to FIG. 8;

FIG. 17 is a plan view of the structure in FIG. 16 in an assembled a state before a collision; and FIG. 18 is a plan view corresponding to FIG. 17, but showing a state of the structure after the collision.

FIGS. 21-22B are views showing the shape of a falling prevention plate according to a seventh exemplary embodiment of the present invention wherein FIG. 21 is an enlarged view similar to FIG. 2; and FIGS. 22A, 22B are views explaining the operation of a falling prevention plate when a load is applied in longitudinal and widthwise directions of the vehicle, respectively.

DETAILED DESCRIPTION OF THE PRESENT EMBODIMENTS

A first exemplary embodiment of the present invention will now be described with reference to FIG. 1 to 13.

Figure 1:
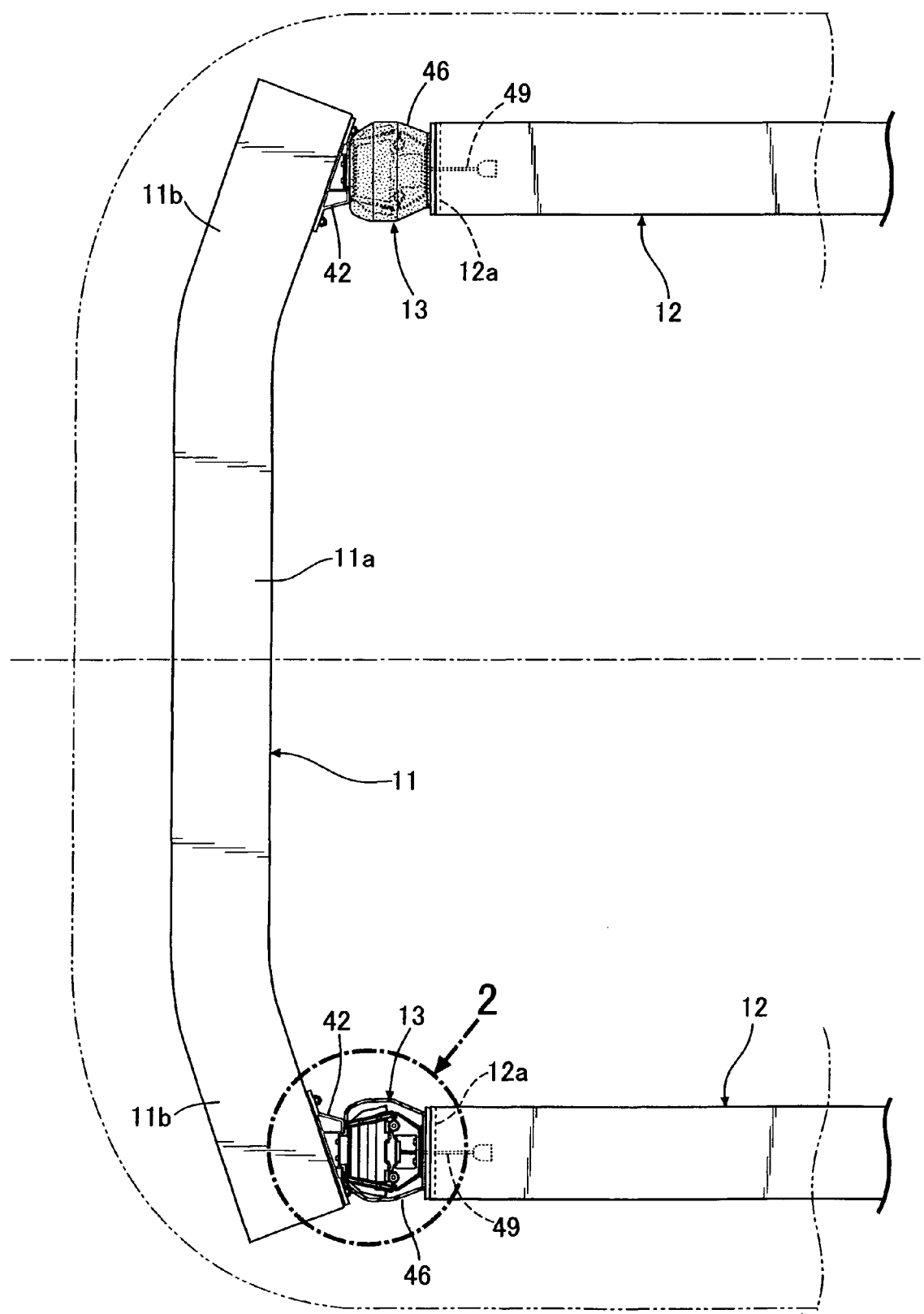

As shown in FIG. 1, a bumper beam 11 disposed at a front portion of a vehicle body of a four-wheel vehicle, includes: a body portion 11a extending straight in a widthwise direction of the vehicle; and left and right inclined portions 11b, 11b inclined from left and right opposite ends of the body portion 11a in the rearward direction of the vehicle body. Leading ends of front side frames 12, 12 disposed in a longitudinal direction on opposite sides of the vehicle body are connected to the left and right inclined portions 11b, 11b of the bumper beam 11 by variable crush-strength devices 13, 13 capable of changing the crush strength. The left and right variable crush-strength devices 13, 13 have substantially the same structure, and hence the structure of the left variable crush-strength device will be described below as an example.

As shown in FIGS. 2 to 7, a mounting plate 14 of each variable crush-strength device 13 is fixed by four bolts 15 to an end plate 12a which closes an opening at a front end of the front side frame 12 having a box-shaped section, and a rear base plate 16 formed of a disc-shaped thick plate is fixed by four bolts 17 to a front surface of the mounting plate 14. A spacer plate 18, a hinge support plate 19 and a block member 20 are superposed on a front surface of the rear base plate 16; four bolts 21 are inserted rearward from within a lightening hole 20a in the block member 20; and the four bolts 21 are passed through the hinge support plate 19 and the spacer plate 18 and fastened to the rear base plate 16.

Each hinge plate 22 disposed respectively on left and right sides of the block member 20 includes a pair of locking pin support portions 22a, 22a bent into a cylindrical shape, and first and second hinge arms 22b and 22c extending from the locking pin support portion 22a, 22a in directions away from each other. A rear end of the first hinge arm 22b is welded at W1 (see FIG. 3) to a corner of an outer end of the hinge support plate 19. The second hinge arm 22c is welded at W2 (see FIG. 3) to an outer surface of a first buckling plate 24 made of an iron material. The first buckling plate 24 has a rib 24a for adjusting the buckling strength at its central portion, and also has four fixing claws 24b at its outer peripheral portion. A rectangular second buckling plate 25 is formed of shape memory alloy substantially in the same size as the first buckling plate 24, and is superposed on an inner surface of the first buckling plate 24 and fixed by the four fixing claws 24b thereto.

The second buckling plate 25 made of shape memory alloy is difficult to process and unsuitable to be welded, and hence it is difficult to integrally couple the first and second buckling plate 24 and 25 to each other by bolting or by welding. However, the first and second buckling plate 24 and 25 are integrally coupled to each other by use of the fixing claws 24b provided on the first buckling plate 24 made of an iron material, or the like, which is easy to process, thereby reliably and integrally coupling the first and second buckling plate 24 and 25 to each other while reducing the processing cost.

Figure 2:
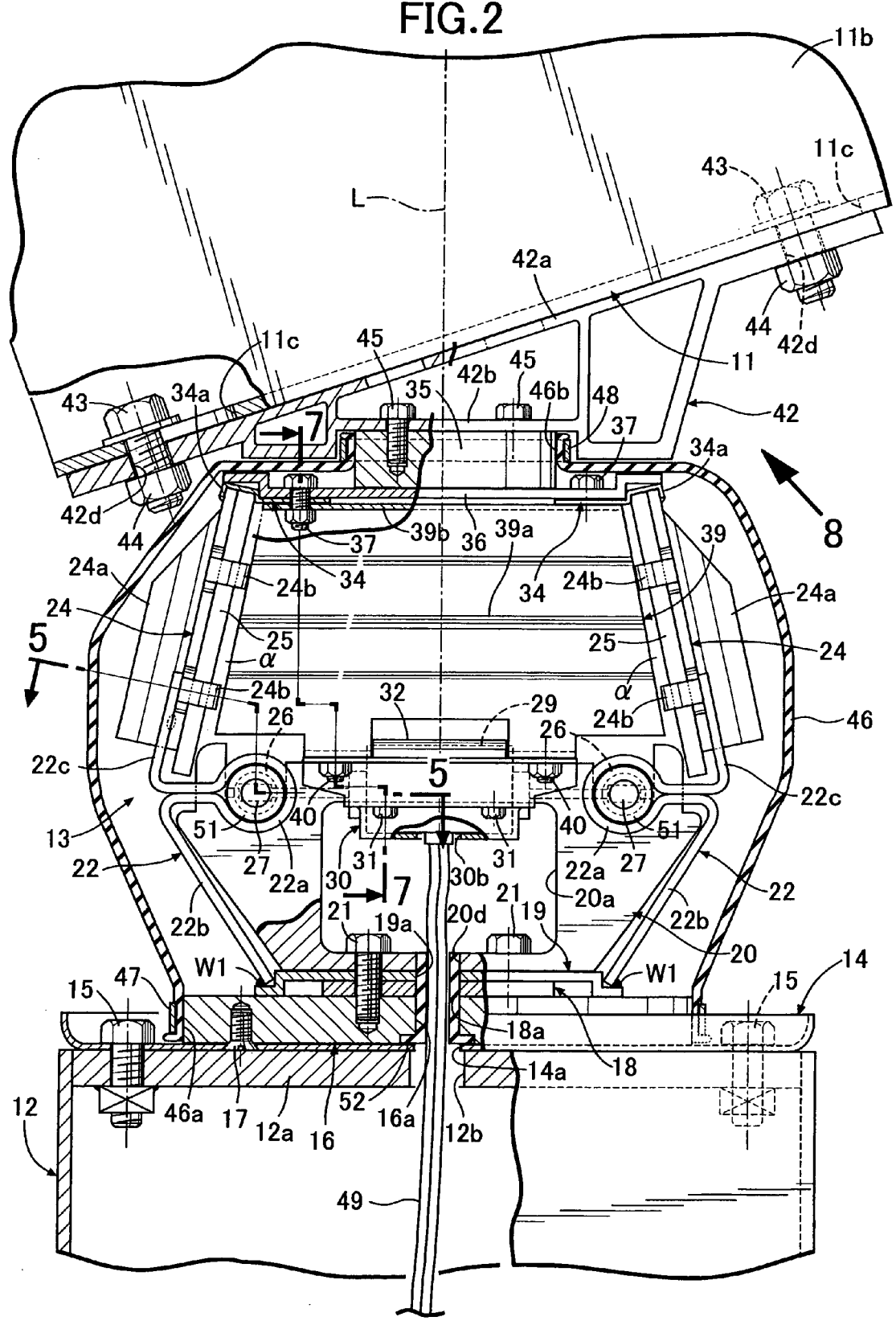
Figure 3:
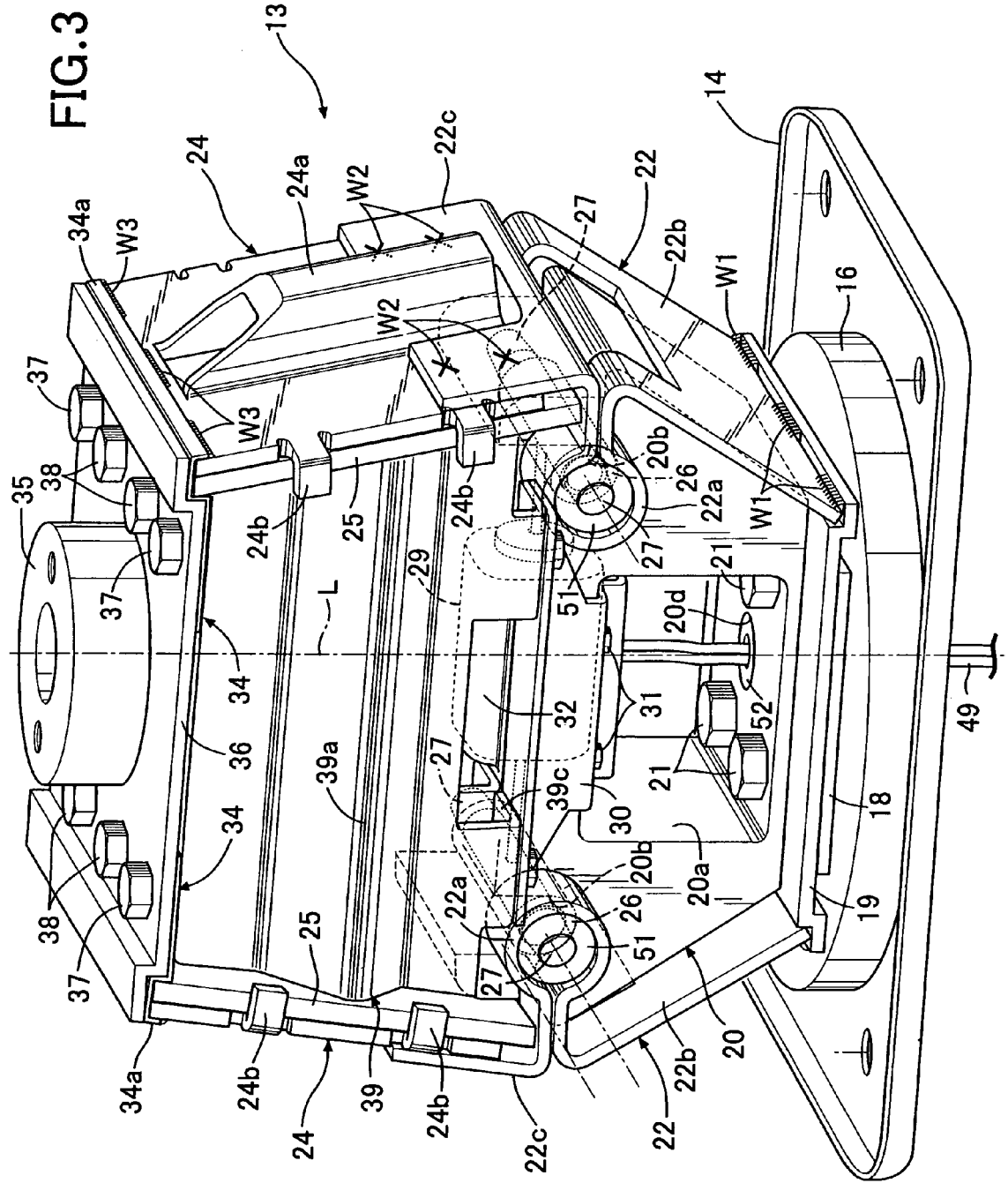
Figure 4:
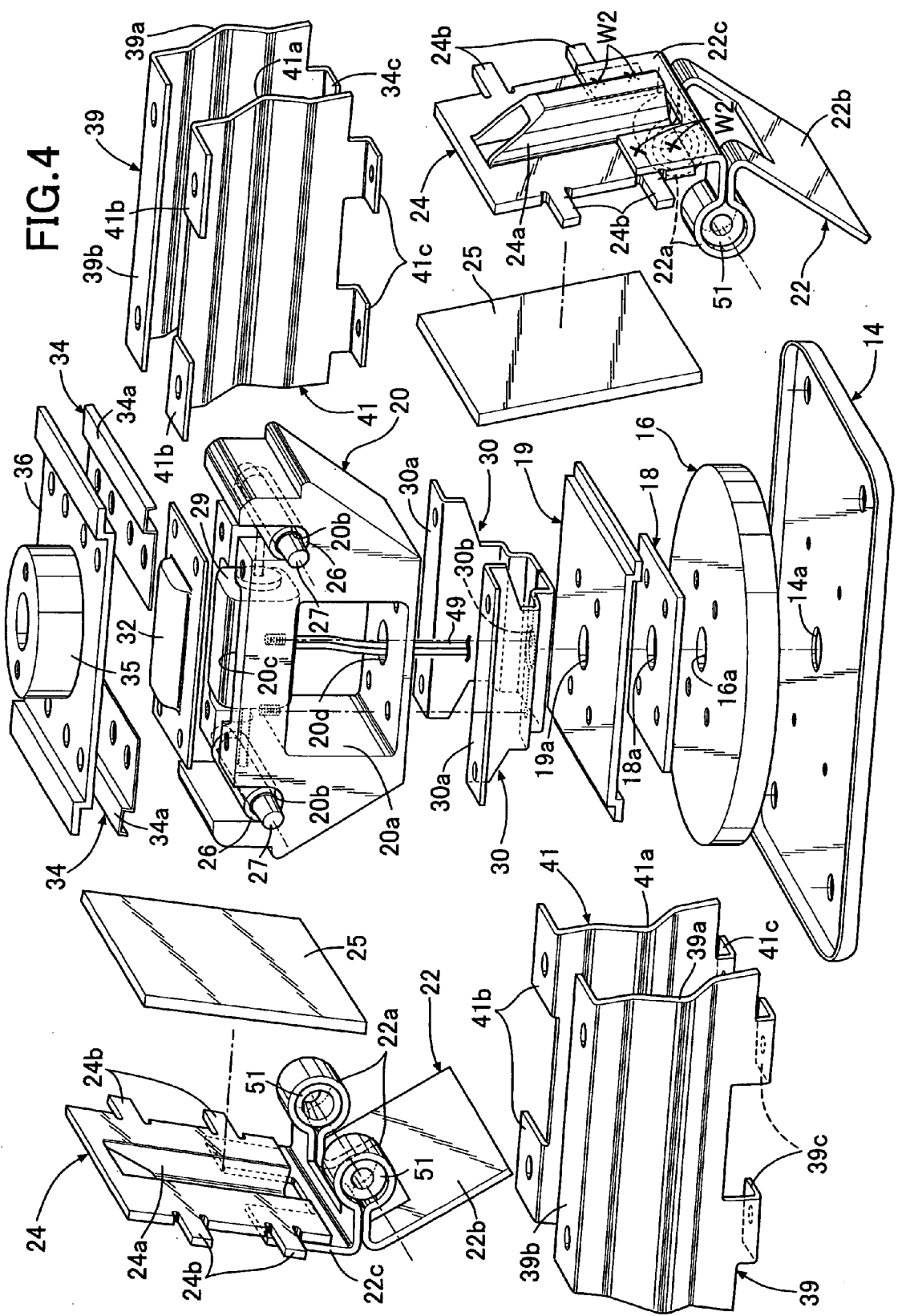

The positions of the front ends of the first and second buckling plates 24 and 25 are aligned with each other, but the rear end of the second buckling plate 25 extends to a position slightly behind the rear end of the first buckling plate 24 (see FIG. 2). In other words, the longitudinal length of the first buckling plate 24 is slightly shorter than that of the second buckling plate 25.

Support grooves 20b, 20b extending vertically and U-shaped in section are formed in left and right opposite sides of the front surface of the block member 20. A cylindrical bush 26 is fixed to each support groove 20b. Two locking pins 27, 27 are slidably supported within the bush 26. A common pinion 28 is meshed with racks 27a, 27a formed respectively on opposed side faces of the locking pins 27, 27. The pinion 28 is fixed to opposite ends of a rotary shaft 29a of a motor 29 which is supported in a motor-supporting hole 20c formed in front of the lightening hole 20a in the block member 20. Therefore, when the pinion 28 is rotated by the motor 29, the pinion 28 drives racks 27a, 27a of the two locking pins 27, 27, so that the locking pins 27, 27 are moved toward or away from each other.

Figure 5:
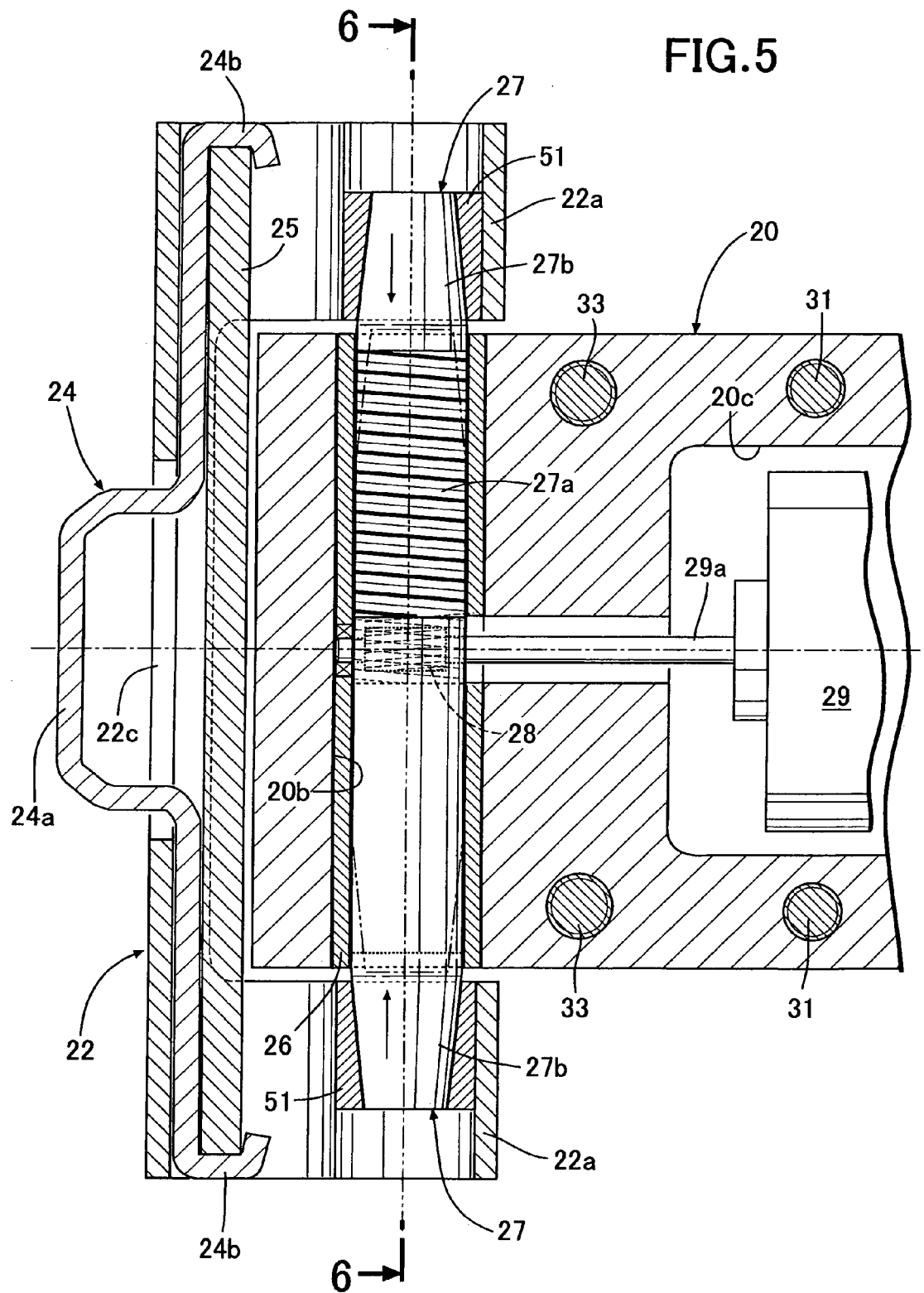
Figure 6:
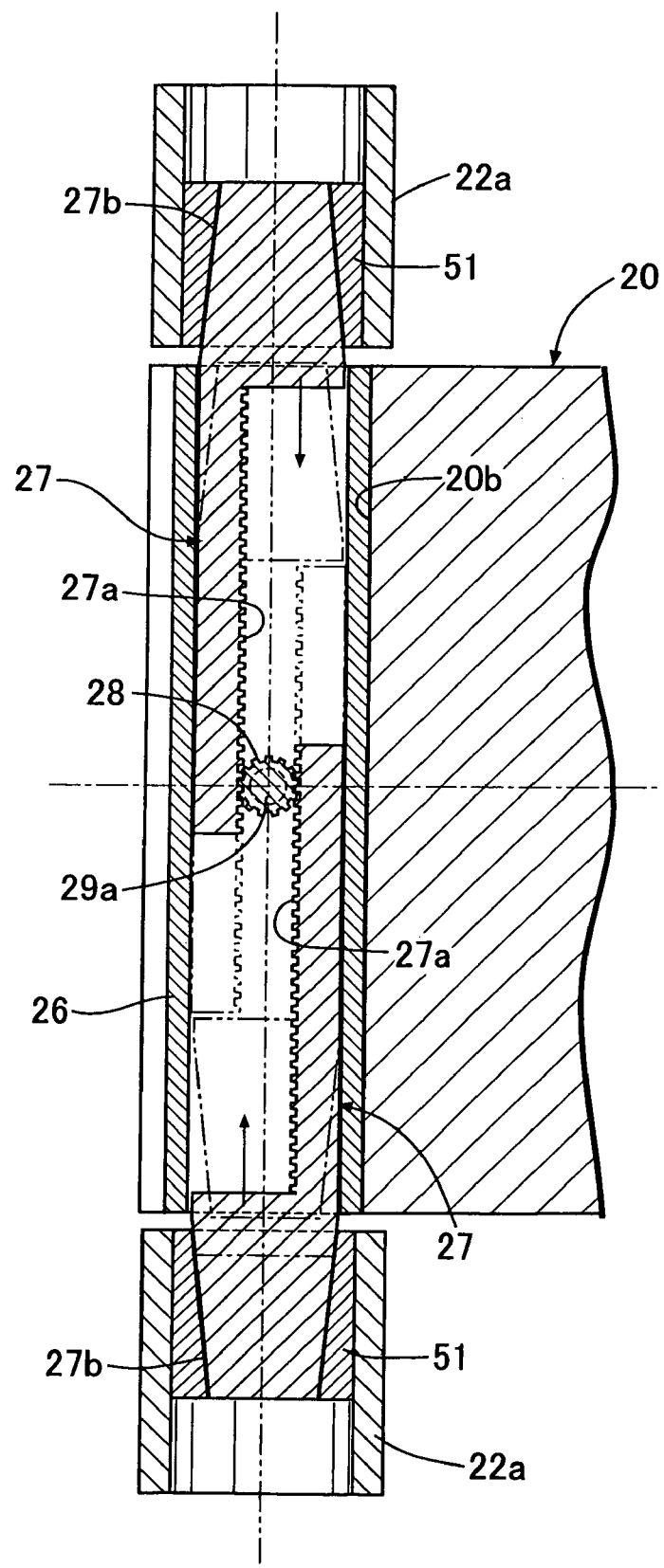
Figure 7:
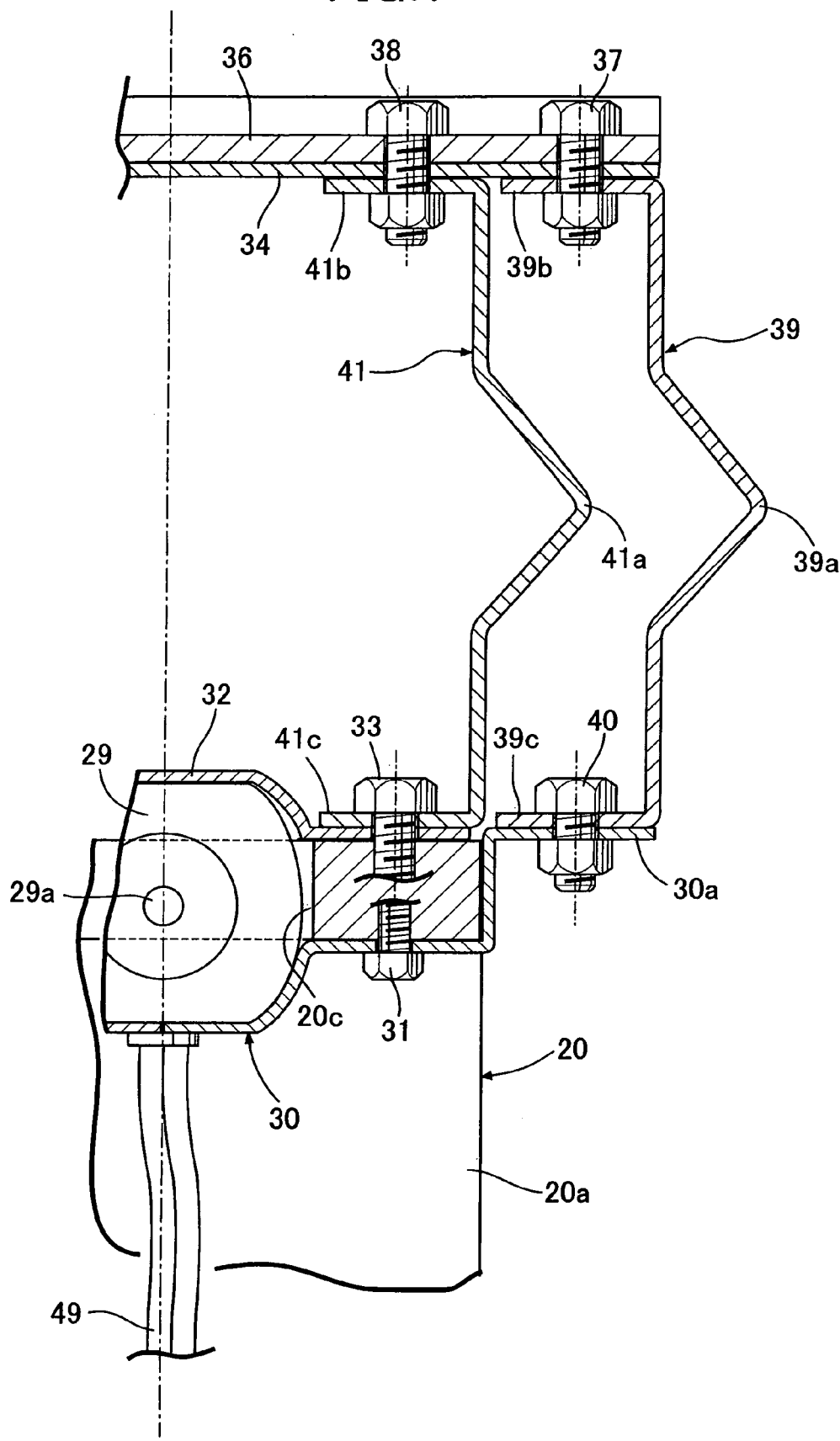

Generally, tapered engagement portions 27b, 27b are provided at tip ends of the two locking pins 27, 27 so as to protrude from an end of the bush 26, and are engaged with receiving members 51, 51 press-fitted into a pair of locking-pin supporting portions 22a, 22a of the hinge plate 22, respectively (see solid lines in FIGS. 5 and 6). When the locking pins 27, 27 are driven by the motor 29 and pulled into the bush 27, the engagement portions 27b, 27b at the tip ends of the locking pins 27, 27 are disengaged from the pair of receiving members 51, 15 of the hinge plate 22 (see dashed lines in FIGS. 5 and 6).

Bisected first motor-supporting plates 30, 30 are fixed by two bolts 31, 31 to a periphery of the motor-supporting hole 20c in the block member 20. A second motor-supporting plate 32 is fixed by four bolts 33 to the periphery of the motor-supporting hole 20c in the block member 20. The motor 29 is supported by the first and second motor-supporting plate 30, 30; 32 such that it is sandwiched therebetween.

On the other hand, a pair of left and right inner buckling plate supporting plates 34, 34 and an outer buckling plate supporting plate 36 which integrally has a thick disc-shaped front base plate 35 are superposed on the front surface of the block member 20 and integrally coupled together by eight bolts 37 and 38. The lateral outer end of each inner buckling plate supporting plate 34 is bent into a groove-shape to form a buckling plate supporting portion 34a, which is engaged with the front ends of the first and second buckling plates 24 and 25 superposed on each other, and is then welded at W3 (see FIG. 3) to the first buckling plate 24.

A first falling prevention plate 39 includes a triangular rib 39a formed at its intermediate portion, and front and rear flanges 39b and 39c. The front flange 39b is fastened by the bolts 37, 37 together with both the inner buckling plate supporting plate 34 and the outer buckling plate supporting plate 36. The rear flange 39c is fixed by two bolts 40, 40 to the flange 30a of the first motor-supporting plate 30. A second falling prevention plate 41 includes a triangular rib 41a formed at its intermediate portion, and front and rear flanges 41b and 41c. The front flange 41b is fastened by the bolts 38, 38 together with both the inner buckling plate supporting plate 34 and the outer buckling plate supporting plate 36. The rear flange 41c is fastened by the two bolts 33, 33 to the second motor-supporting plate 32.

Each of the first and second falling prevention plates 39 and 41 is a generally trapezoidal member, whose front edge, which corresponds to an upper bottom, is fixed to the inner buckling plate supporting plate 34 and the outer buckling plate supporting plate 36; whose rear edge, which corresponds to a lower bottom, is fixed to the block member 20; and whose left and right side edges, which correspond to a pair of diagonal sides, are opposed to the inner surface of the second buckling plate 25 with a small gap $\alpha$ (see FIG. 2) left therebetween.

Figure 8:
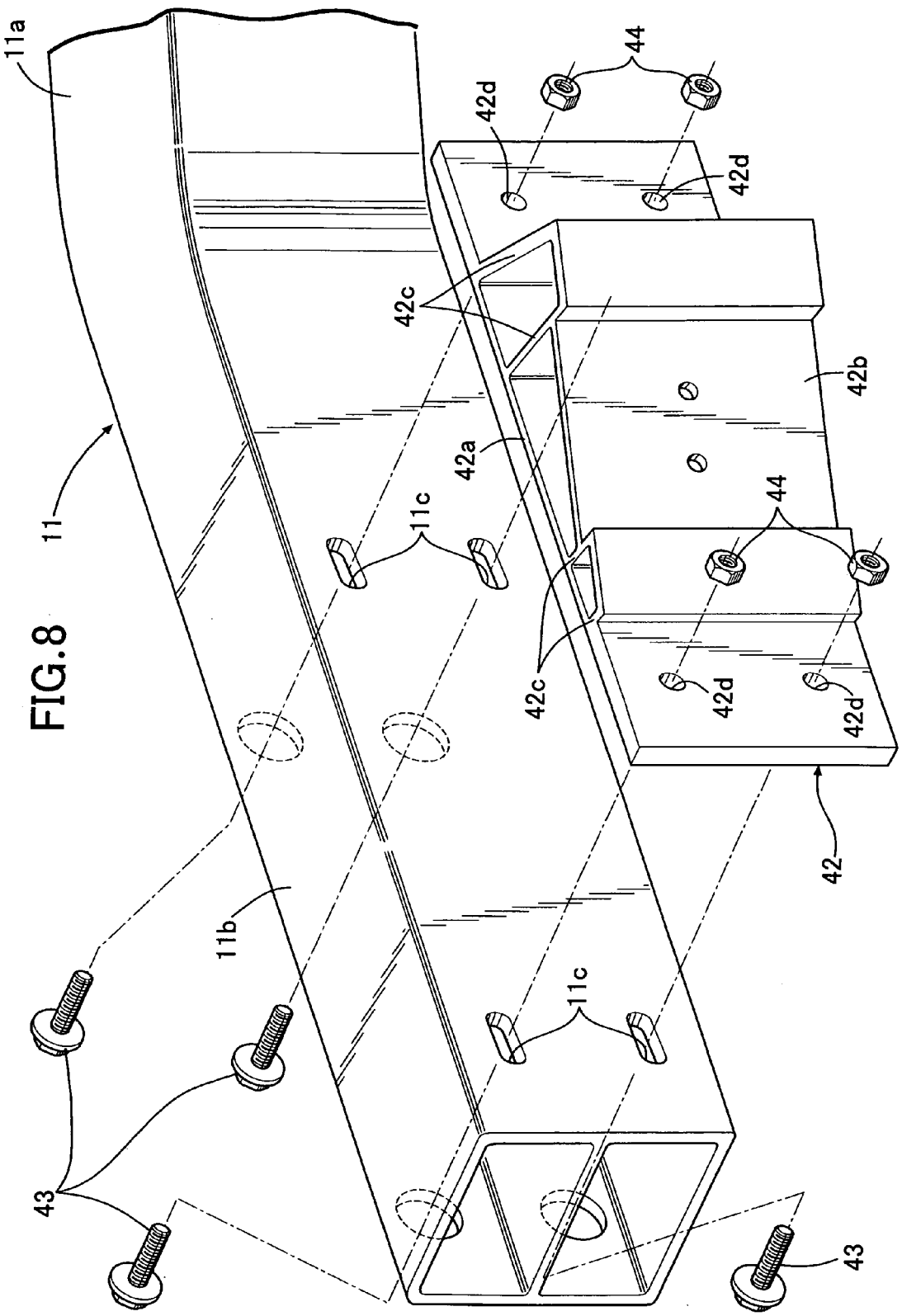

As is apparent from FIGS. 2 and 8, a mounting bracket 42 for connecting the bumper beam 11 and the variable crush-strength device 13 to each other, includes: a first mounting portion 42a which is diagonally inclined with respect to an axis L extending in a longitudinal direction of the vehicle body and which is parallel to the inclined portion 11b of the bumper beam 11; a second mounting portion 42b parallel to the front base plate 35 of the variable crush-strength device 13; and a plurality of thinner ribs 42c extending in the longitudinal direction of the vehicle body and connecting the first and second mounting portions 42a and 42b to each other. Four first bolt holes 11c which are long in the lateral direction are formed in a rear surface of the inclined portion 11b of the bumper beam 11. These first bolt holes 11c and second bolt holes 42d in the first mounting portion 42a of the mounting bracket 42 are fastened to each other by four bolts 43 and four nuts 44. The second mounting portion 42b of the mounting bracket 42 and the front base plate 35 of the variable crush-strength device 13 are fastened to each other by two bolts 45, 45.

In a state in which the variable crush-strength device 13 having the above-described structure is housed within an expandable and contractable boot 46 made of rubber as shown in FIGS. 1 and 2, a rear opening 46a in the boot 46 is fitted over an outer periphery of the circular rear base plate 16 and fastened thereto by a band 47, and a front opening 46b in the boot 46 is fitted over an outer periphery of the circular front base 35 and fastened thereto by a band 48. With this arrangement, the boot 46 prevents water and mud from attaching to the variable crush-strength device 13, thereby enhancing the durability of the variable crush-strength device 13 and securing reliable operation thereof.

As is apparent from FIGS. 1 to 4, a harness 49 extends from the motor 29 to pass through openings 30b in the first motor-supporting plates 30, 30; then passes through the grommet 52 mounted in the opening 20d in the block member 20, the opening 19a in the hinge supporting plate 19, the opening 18a in the spacer plate 18 and the opening 16a in the rear base plate 16; further passes through the opening 14a in the mounting plate 14 and the opening 12b in the end plate 12a of the front side frame 12, namely, is guided into the front side frame 12. Therefore, there is no need to form a hole in the boot 46 and draw the harness 49 out of the hole. Thus, it is possible to ensure that the boot 46 is water-proof, and also protect the harness 49 against water and mud because the harness 49 is guided into the front side frame 12 having a closed section.

The operation of the first embodiment of the present invention having the above-described arrangement will be described blow.

In an normal state, the locking pins 27, 27 of the variable crush-strength device 13 protrude from the opposite ends of the bush 26, and therefore the engagement portions 27b, 27b at the tip ends of the locking pins 27, 27 are in engagement with the receiving member 51, 51 of the hinge plate 22 (see solid lines in FIGS. 5 and 6). In this state, when the vehicle collides head-on with an object thereby applying a collision load to the bumper beam 11 in the rearward direction of the vehicle body, the front base plate 35 and the rear base plate 16 of the variable crush-strength device 13 disposed between the bumper beam 11 and the front side frame 12 are longitudinally compressed.

Figure 9A:
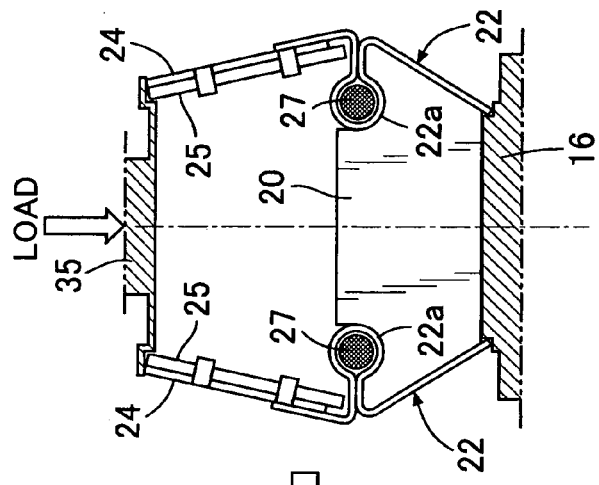
FIGS. 9A to 9C are views for explaining the operation of the variable crush-strength device in a high-load mode.
Figure 9B:
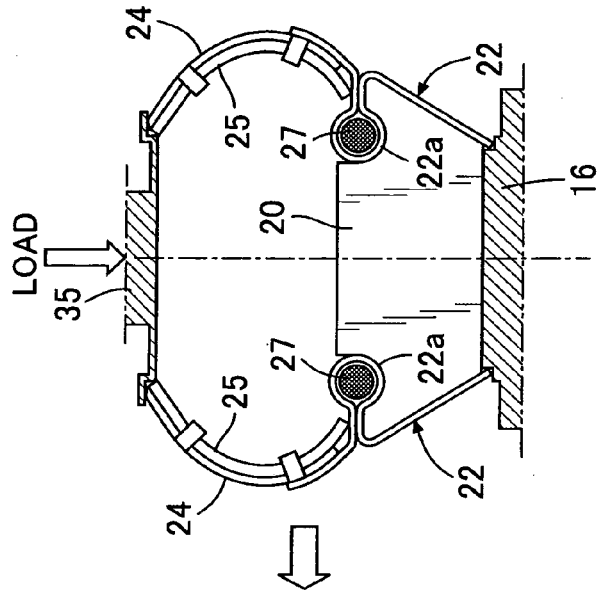
Figure 9C:
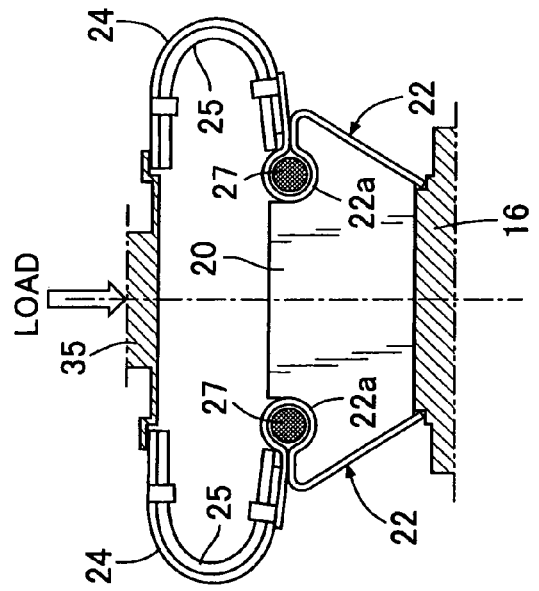

At this time, as shown in FIGS. 9A to 9C, the lateral movements of the locking pin-supporting portions 22a, 22a of the hinge plate 22 are restricted by the locking pins 27, 27, and the rearward movements of the locking pins 27, 27 are restricted by the strong block member 20. Therefore, the first and second buckling plates 24 and 25, which are superposed on each other, are longitudinally compressed and buckled, whereby the variable crush-strength device 13 can absorb a large collision energy (high-load mode).

On the other hand, when a collision requiring a shock to be reduced is predicted (for example) from an external circumference detected by a radar device or a television camera mounted on the vehicle and from a vehicle speed detected by a vehicle speed sensor, the motor 29 is actuated to retract the pair of locking pins 27, 27 into the bush 26 through the pinion 28 and the racks 27a, 27a, whereby the engagement portions 27b, 27b of the locking pins 27, 27 are disengaged from the receiving member 51, 51 of the hinge member 22 (see dashed lines in FIGS. 5 and 6). As a result, the locking pin-supporting portions 22a, 22a of the hinge plate 22 become movable in leftward and rightward directions. Thus, as shown in FIGS. 10A to 10C, the first and second buckling plates 24 and 25 are folded without being buckled, so that the variable crush-strength device 13 is crushed by a small load to permit the retraction of the bumper beam 11 (low-load mode).

In each case of the above-described high-load mode and low-load mode, the first and second falling prevention plates 39 and 41 are buckled upon reception of a longitudinal compressing load. Specifically, the first and second falling prevention plates 39 and 41 are buckled remarkably easily when they receive a longitudinal load, because each of them are originally formed of a thin plate having the rib 39a, 41a, respectively, formed at its central portion. Therefore, the first and second falling prevention plates 39 and 41 never affect the longitudinal energy absorbing property of the variable crush-strength device 13. Thus, even in the low-load mode wherein it is intended to crush the variable crush-strength device 13 with a low load, there is no possibility that the variable crush-strength device 13 becomes difficult to crush by the first and second falling prevention plates 39 and 41. Please note that the first and second falling prevention plates 39 and 41 are omitted in FIGS. 9A to 9C and FIGS. 10A to 10C.

The first and second falling prevention plates 39 and 41 function when a collision load inclined with respect to the longitudinal direction of the vehicle body is applied to the bumper beam 11 upon a diagonal collision. The collision load generated upon diagonal collision includes a longitudinal load component which moves the bumper beam 11 in the rearward direction of the vehicle body, and a lateral load component which moves the bumper beam 11 in the widthwise direction of the vehicle body.

As schematically shown in FIG. 11A, when the lateral load is input to the variable crush-strength device 13, a shearing force is applied to a portion between the front base plate 35 and the rear base plate 16. Therefore, the first and second buckling plates 24 and 25 on the right side as well as the first and second buckling plates 24 and 25 on the left side fall down in the lateral direction without being buckled, leading to a possibility that the energy absorbing performance is only slightly exhibited even in the high-load mode.

However, in the first embodiment, as shown in FIG. 11B, because a total of four first and second falling prevention plates 39 and 41 are disposed in a trapezoidal space between the opposed left and right second buckling plates 25, 25, the first and second falling prevention plates 39 and 41 inhibit the left and right first and second buckling plates 24 and 25 from falling down into a state shown in FIG. 11A, thereby reliably causing the variable crush-strength device 13 to be longitudinally crushed to effectively exhibit the energy absorbing performance.

In addition, because the triangular ribs 39a and 41a (see FIG. 7) are formed on the first and second falling prevention plates 39 and 41, the load to start the buckling can be reduced to provide a characteristic of a small fluctuation of load. Also, the small gap a (see FIG. 2) is present between the first and second falling prevention plates 39 and 41 and the second buckling plate 25, and when the first and second buckling plates 24 and 25 slightly fall down, the second buckling plate 25 is brought into contact with the first and second falling prevention plates 39 and 41 without any trouble.

In the high-load mode in which the variable crush-strength device 13 is crushed by a large load, it is desirable that, during buckling, the first and second buckling plates 24 and 25 generate a constant high load for a period from the start to end of the crushing.

Figure 12:
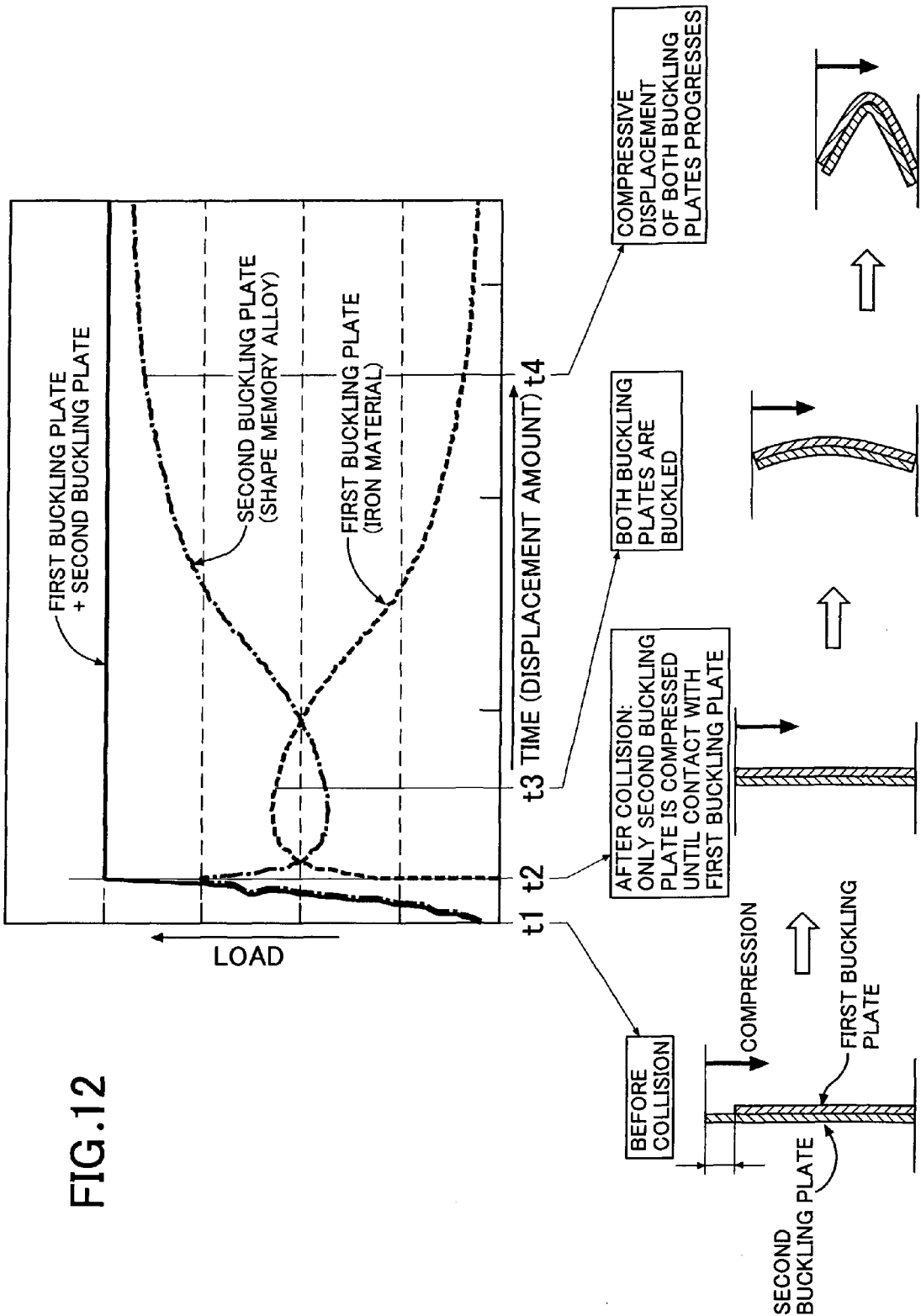
Figure 13:
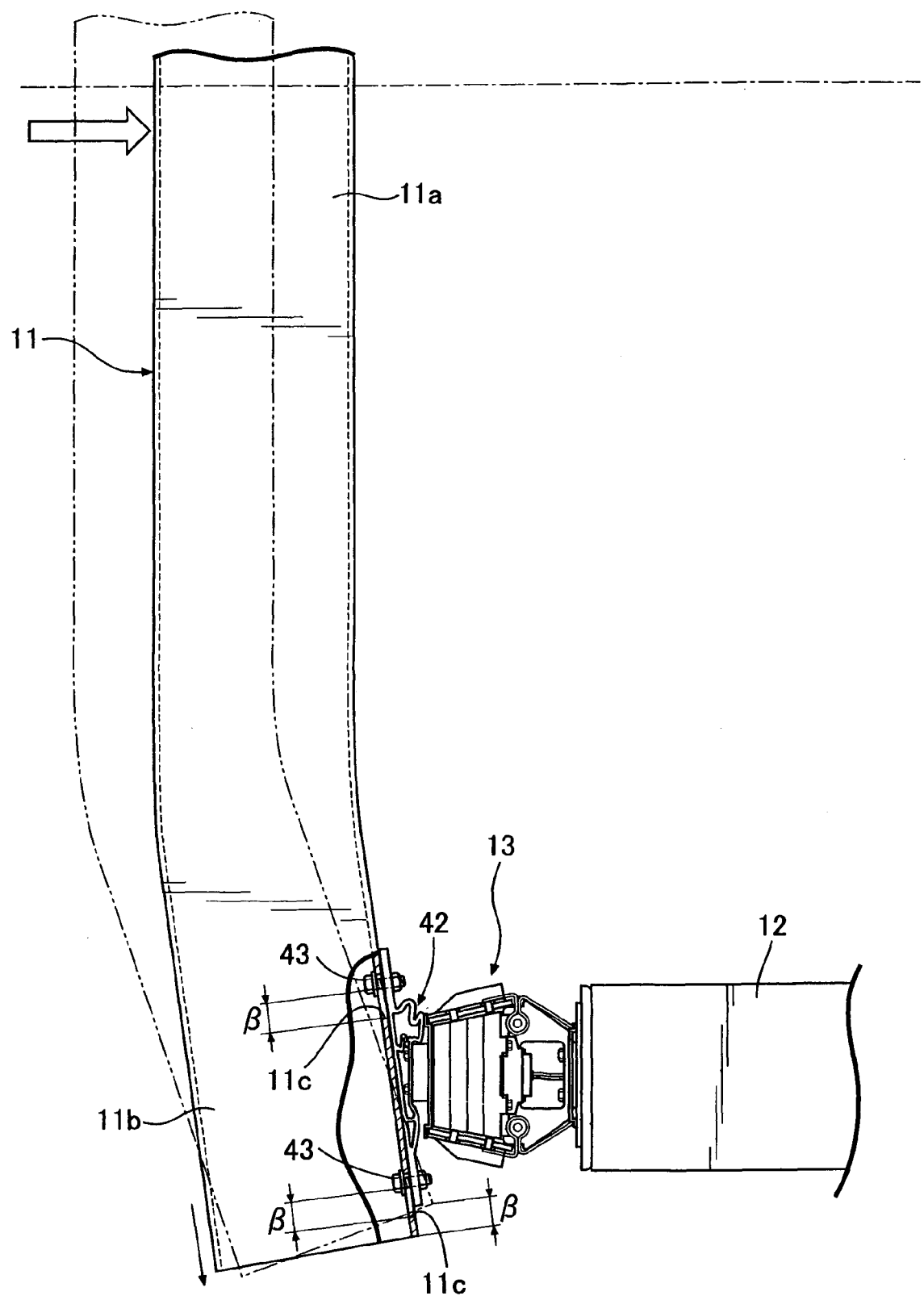

As is apparent from the graph in FIG. 12 showing the relationship between time (displacement amount) and load, the first buckling plate 24 made of a general iron material, or the like, has a characteristic such that that the load steeply increases with an increase in the displacement amount to reach a peak and thereafter gradually decreases. On the other hand, the second buckling plate 24 made of shape memory alloy, or the like, has a characteristic such that that the load steeply increases with an increase in the amount of displacement to reach a peak and then steeply decreases to reach a bottom, and further gradually increases from the bottom. Therefore, if the first buckling plate 24 or the second buckling plate is used alone, it is impossible to generate a constant high load for a period from the start to end of the crushing. However, if it is arranged such that the deformation of the first buckling plate 24 is started when the deformation of the second buckling plate 25 reaches a peak at a time point t2 after starting at a time point t1, the load-decreasing/increasing characteristic of the second buckling plate 25 and the load-decreasing/increasing characteristic of the first buckling plate 24 for a period from the time point t2 via a time point t3 to a time point t4 becomes vertically symmetric with each other.

Therefore, it is possible to provide an ideal characteristic, as shown by a solid line, because of the combination of these load-decreasing/increasing characteristics, namely, a characteristic in which a constant high load is generated from the start to end of the crushing.

A difference in timing between the start of deformation of the first and second buckling plate 24 and 25 can, for example, be obtained by the following arrangement. In the first and second buckling plates 24 and 25 which are superposed on and integrally connected to each other by the fixing claws 24b, the second buckling plate 25, made of shape memory alloy, is slightly longer than the first buckling plate 24, which is made of an iron material or the like. The longer second buckling plate 25 first starts deformation (at the time point t1) and is compressed by a predetermined amount, and then the shorter first buckling plate 24 is deformed along with the second buckling plate 25 (at the time point t2).

Because the second buckling plate 25 is made of shape memory alloy, it is difficult to process as compared with the case of iron material, the second buckling plate 25 is formed into a simple shape for cost reduction. However, it is possible to adjust the load-generating characteristic of the first buckling plate 24 so as to generate a load vertically symmetric with a load generated by the second buckling plate 25 after the time point t2, if the thickness of the easily processable first buckling plate 24 made of the iron material or the like is adjusted or a rib 24a of a predetermined shape is formed on the first buckling plate 24.

In the first embodiment, the first buckling plate 24 is made of an iron material, but another material such as an aluminum material can be used.

When the vehicle collides head-on against an object thereby applying a rearward load to the bumper beam 11, the fragile ribs 42c of the mounting bracket 42 are crushed, whereby the inclined portion 11b inclined rearward with respect to the body portion 11a is deformed so as to be substantially parallel to the body portion 11a, and hence the lateral dimension of the bumper beam 11 is increased by β. At this time, supposing that the bumper beam 11 and the variable crush-strength device 13 are relatively laterally non-movably coupled to each other, the variable crush-strength device 13 falls down outward of the vehicle body due to the increase in the lateral length of the beam bumper 11, leading to a possibility that the collision load is effectively absorbed.

However, in the first embodiment, as shown in FIG. 8, because the first bolt holes 11c formed in the rear surface of the inclined portion 11b of the bumper beam 11 comprises elongate holes which are long in the lateral direction, the inclined portion 11b of the bumper beam 11 can slide outward of the vehicle body with respect to the bolts 43 passing through both the first bolt holes 11c and the second bolt holes 42d in the mounting bracket 42. Therefore, even if the bumper beam 11 is laterally elongated upon the frontal collision of the vehicle, the variable crush-strength device 13 is prevented from falling down, thereby reliably causing the variable crush-strength device 13 to exhibit its intended function.

Also, because the variable crush-strength device 13 is to be easily deformed in the longitudinal direction, it is possible to set a target load without reducing the compression strength of the first and second falling prevention plates 38 and 41. Therefore, it is possible to prevent the reduction in falling-down strength in the lateral direction.

Figure 14:
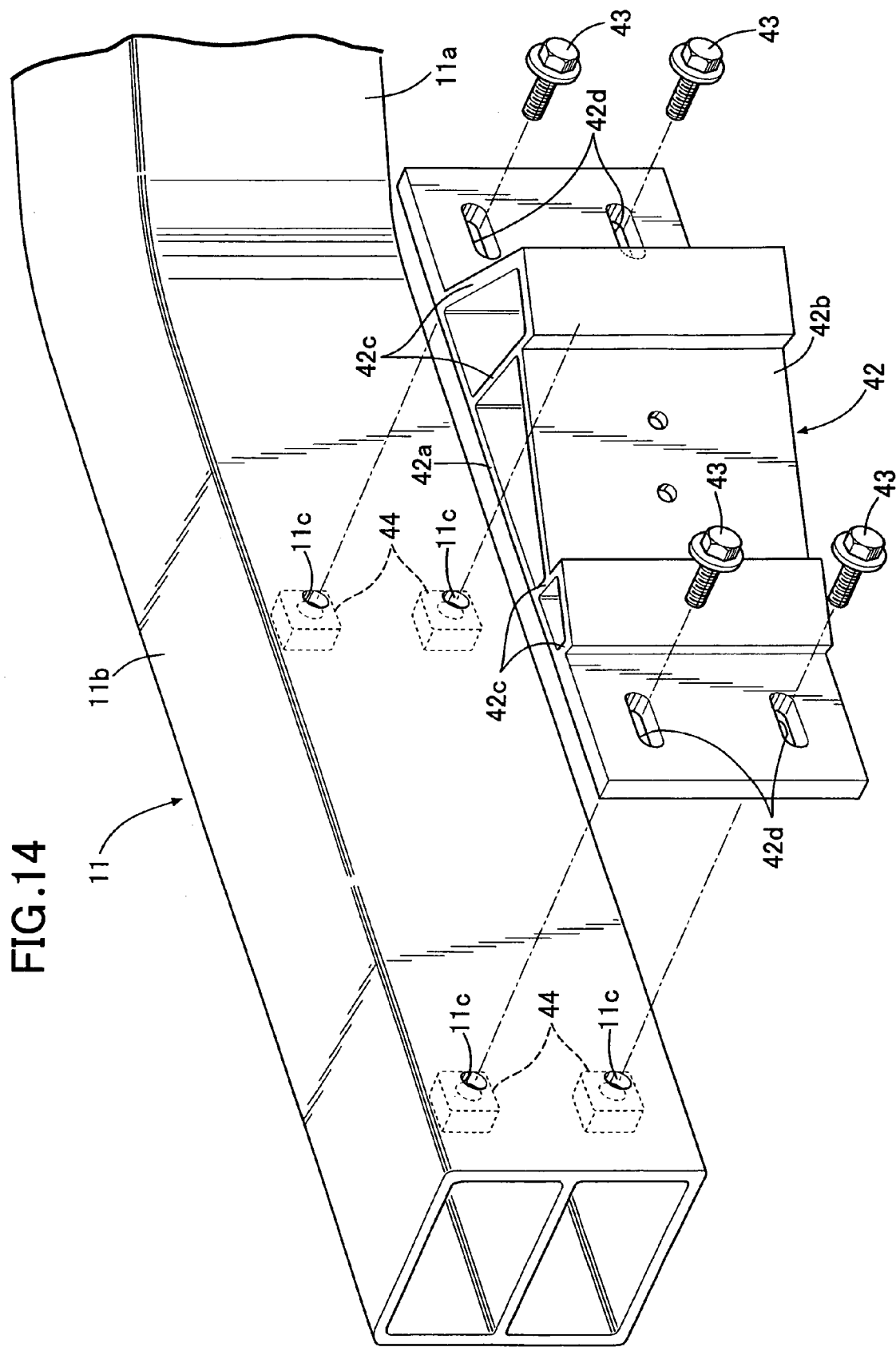
FIG. 14 is an exploded view similar to FIG. 8, but according to a second exemplary embodiment of the present invention.

A second exemplary embodiment of the present invention will now be described with reference to FIG. 14.

In the first embodiment, among the first bolt holes 11c in the bumper beam 11 and the second bolt holes 42d in the mounting bracket 42, the first bolt holes 11c are formed as elongate holes, but in the second embodiment, the second bolt holes 42d are formed as elongate holes.

Also, the second embodiment achieves the same effect as that in the first embodiment.

Figure 15:
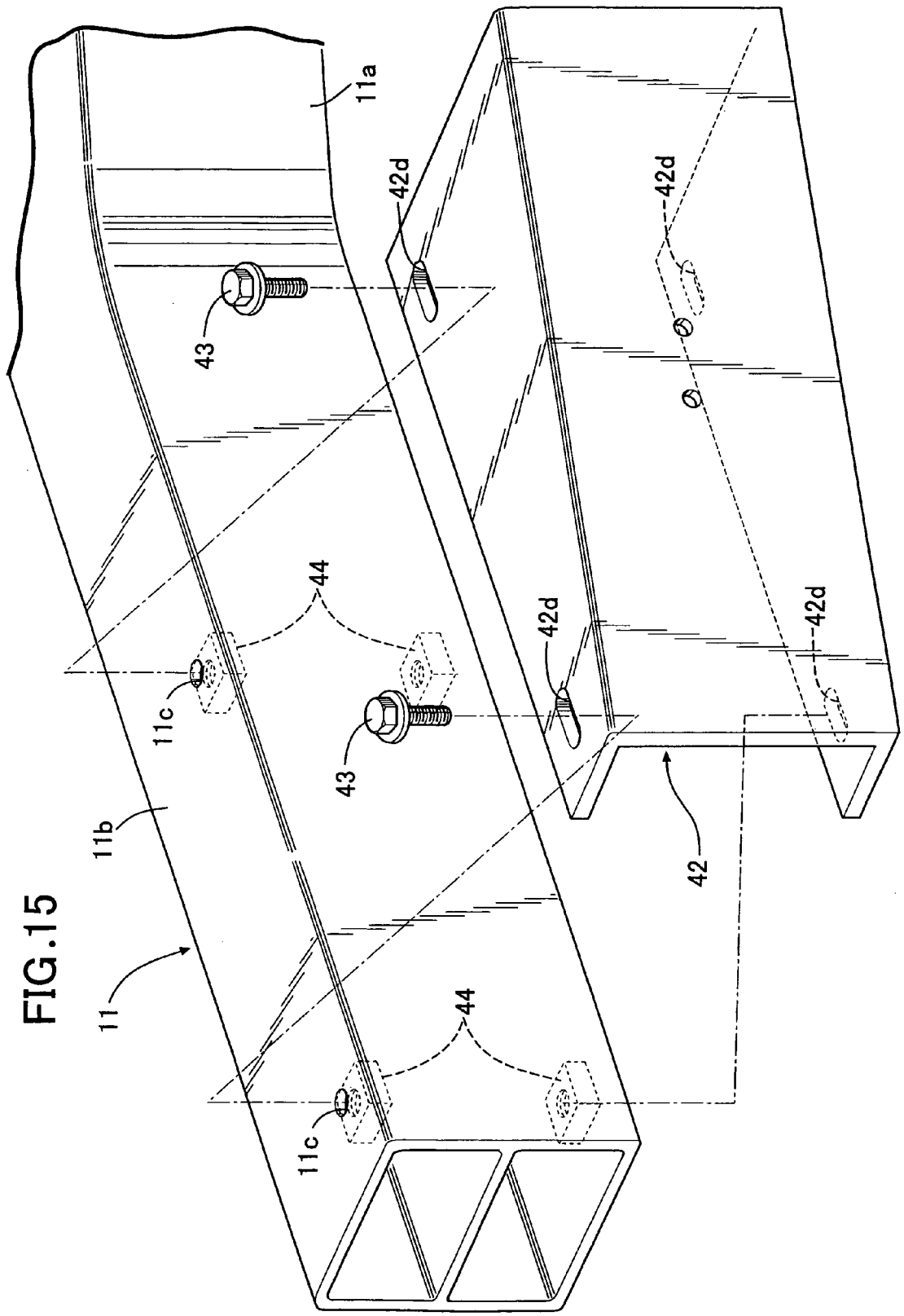
FIG. 15 is an exploded view similar to FIG. 8, but according to a third exemplary embodiment of the present invention.

A third exemplary embodiment of the present invention will now be described with reference to FIG. 15.

The third embodiment is a modification of the first embodiment or the second embodiment, in which a mounting bracket 42 is formed by folding a plate material into an angular U-shape bracket with its left side open; second elongate bolt holes 42d are formed in upper and lower walls of the mounting bracket 42 so as to extend in the widthwise direction of the vehicle; and these second bolt holes 42d and first bolt holes 11c are fastened to each other by bolts 43 and nuts 44.

Also the third embodiment achieves the same effect as that in the first and second embodiments.

A fourth exemplary embodiment of the present invention will now be described with reference to FIGS. 16 to 18.

Figure 16:
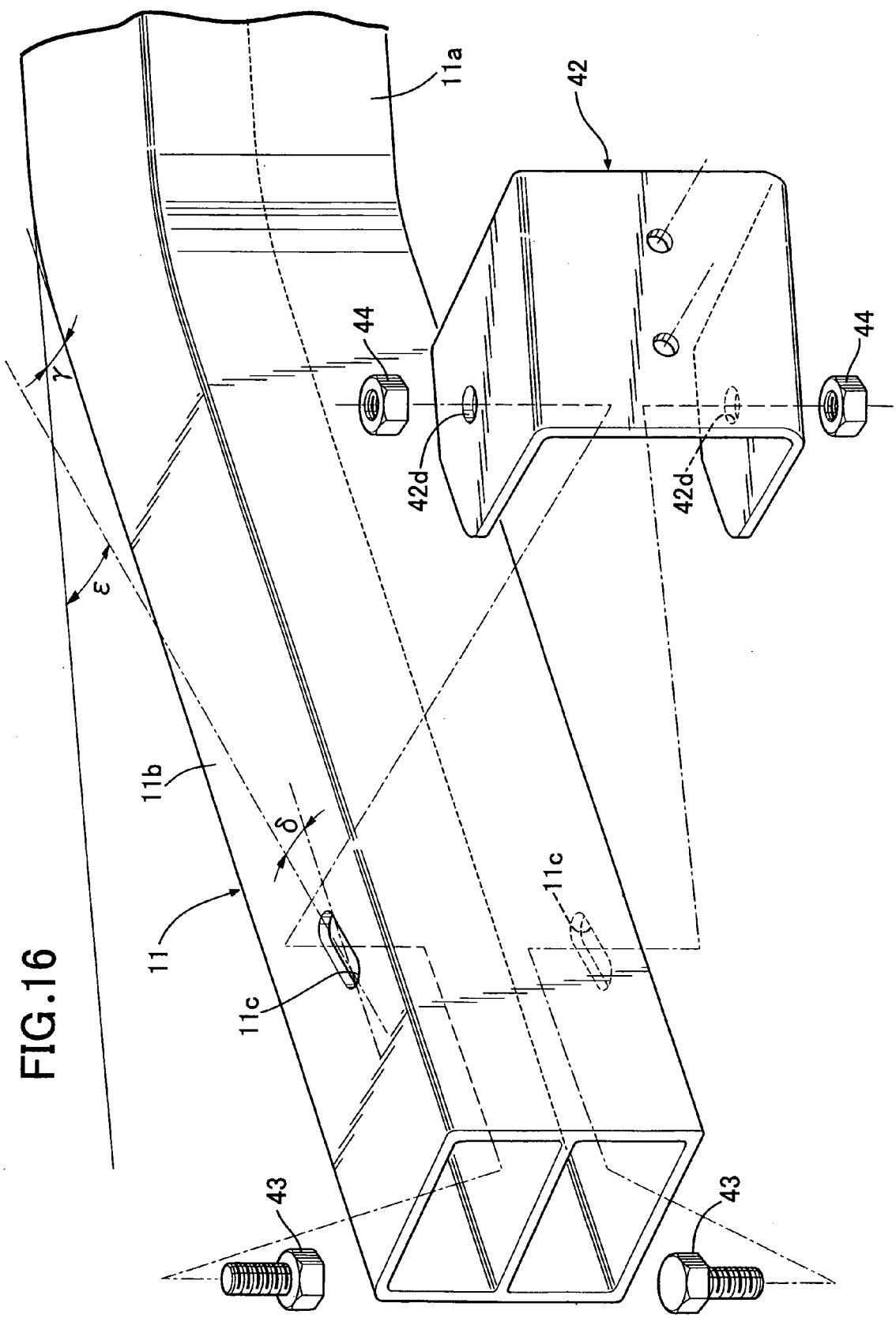
Figure 17:
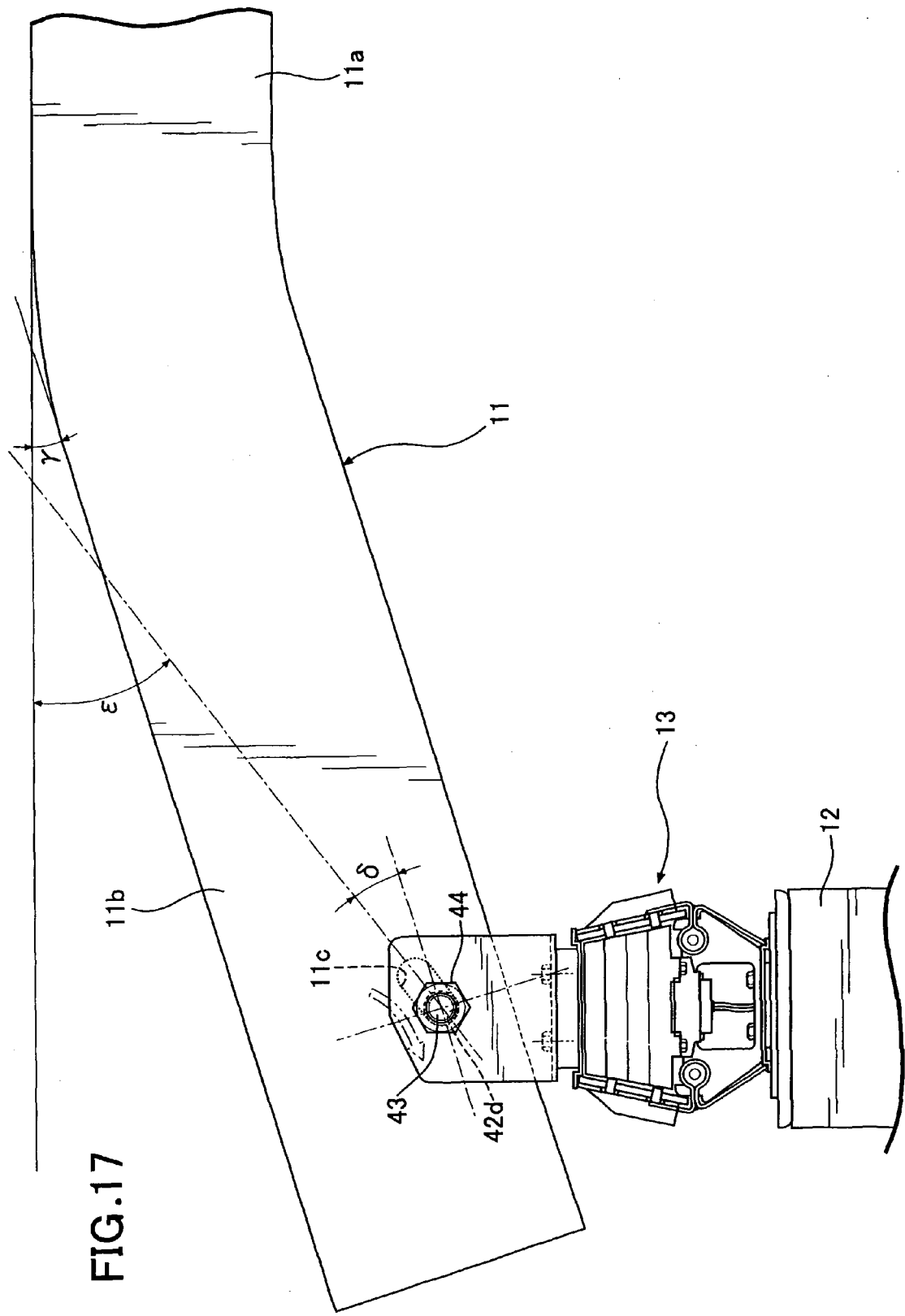

As shown in FIGS. 16 and 17, as in the third embodiment, the fourth embodiment includes a mounting bracket 42 formed by folding a plate material into an angular U-shape bracket with its left side open. Two first elongate bolt holes 11c, 11c are formed in upper and lower walls of an inclined portion 11b of a bumper beam 11. Two circular second bolt holes 42d, 42d are formed in upper and lower walls of the mounting bracket 42. The first bolt holes 11c, 11c and the second bolt holes 42d, 42d are fastened to each other by bolts 43, 43 and nuts 44, 44.

The directions of extension of the two first elongate bolt holes 11c, 11c formed in the upper and lower walls of the inclined portion 11b of the bumper beam 11, are not parallel to a direction of the inclined portion 11b inclined rearward of the vehicle body, and are inclined more steeply than the inclination of the inclined portion 11b. More specifically, the inclined portion 11b is inclined by an angle γ with respect to the direction of extension of the body portion 11a of the bumper beam 11 (in the widthwise direction of the vehicle), and also the direction of extension of the first bolt hole 11c is inclined further rearward by an angle δ with respect to the direction of extension of the inclined portion 11b. Therefore, the direction of extension of the first bolt hole 11c is inclined by an angle ε=γ+δ with respect to the direction of extension of the body portion 11a. In the fourth embodiment γ is set to be equal to δ, and hence the angle ε formed by the first bolt hole 11c with respect to the direction of extension of the body portion 11a is equal to γ+δ=2γ.

Figure 18:
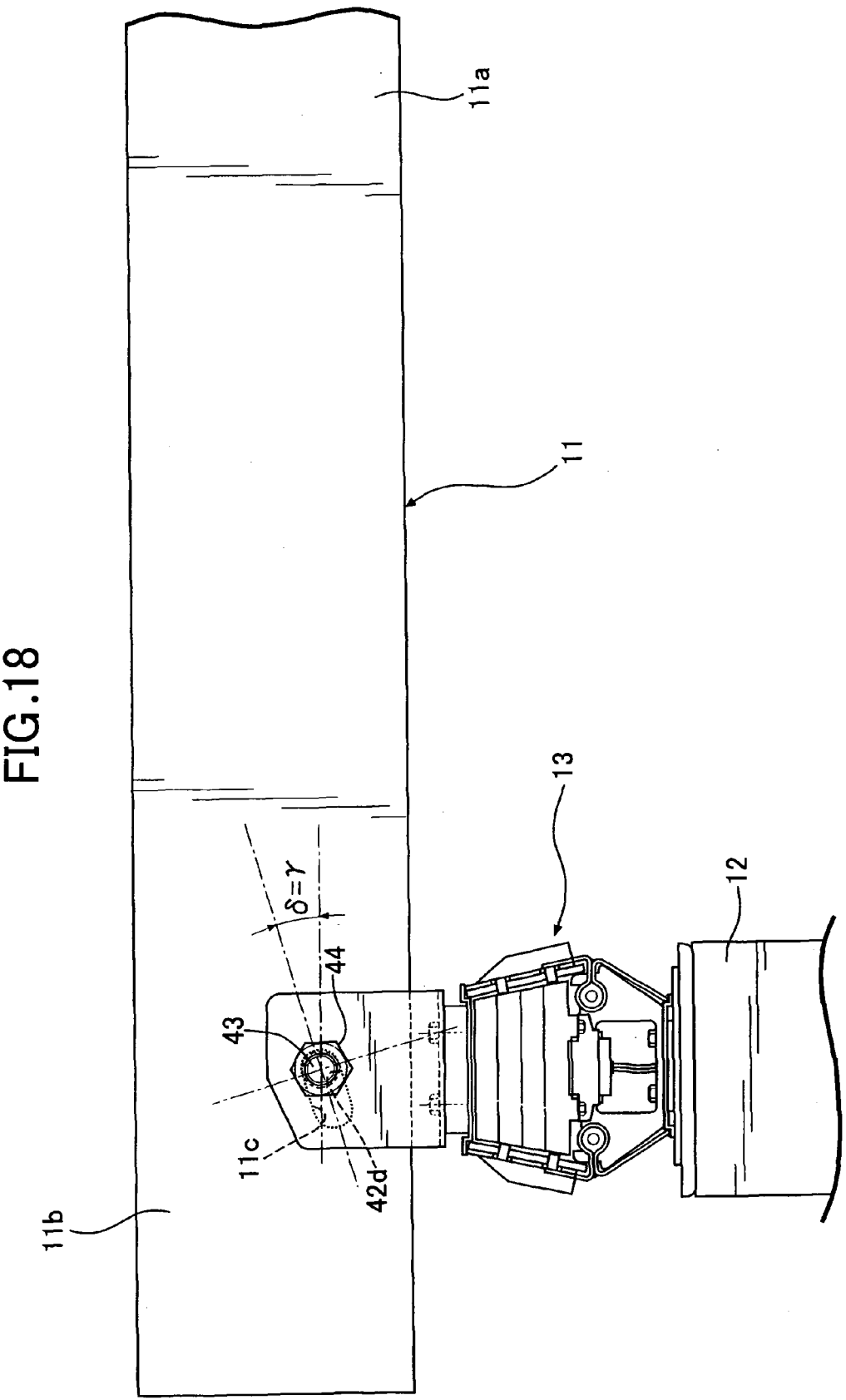

As shown in FIG. 18, when a collision load in the rearward direction of the vehicle body is applied to the bumper beam 11, the inclined portion 11b inclined rearward with respect to the body portion 11a is deformed so as to form a straight line along with the body portion 11a, namely, so as to extend in the widthwise direction of the vehicle. At this time, supposing that the first bolt hole 11c is formed parallel to the direction of extension of the inclined portion 11b, and the angle γ of inclination of the inclined portion 11b is decreased upon collision, the direction of extension of the first bolt hole 11c becomes close to the widthwise direction of the vehicle, as shown by a dashed line. Therefore, there is a possibility that the collision load in the rearward direction of the vehicle body would not be successfully, completely absorbed, and the first bolt hole 11c would not smoothly slide along the bolt 44.

However, according to the fourth embodiment, the direction of extension of the first bolt hole 11c is inclined more steeply than the direction of inclination of the inclined portion 11b, and hence even if the angle γ of inclination of the inclined portion 11b is decreased due to the collision, the direction of extension of the first bolt hole 11c is still inclined by the angle δ (=γ) with respect to the widthwise direction of the vehicle. Therefore, it is possible to cause the bolt hole 11c to smoothly slide along the bolt 44 while successfully allowing the collision load to be fully absorbed in the rearward direction of the vehicle body. Thus, the variable crush-strength device 13 is prevented from falling down outward of the vehicle body, thereby reliably causing the variable crush-strength device 13 to exhibit its intended function.

Especially because the angle δ is set to be equal to γ, even if the inclined portion 11b is deformed by the collision load so as to form a straight line along with the body portion 11a, the direction of extension of the first bolt hole 11c is maintained in a state in which it is inclined only by the angle γ, which is the angle of inclination of the inclined portion 11b before the collision, with respect to the widthwise direction of the vehicle. Thus, it is possible to further reliably prevent the falling-down of the variable crush-strength device 13.

In the fourth embodiment, the mounting bracket 42 and the bumper beam 11 are fastened to each other by the two upper and lower bolts 43, 43, but they may be fastened to each other by a single bolt 43 completely passing therethrough.

Figure 19:
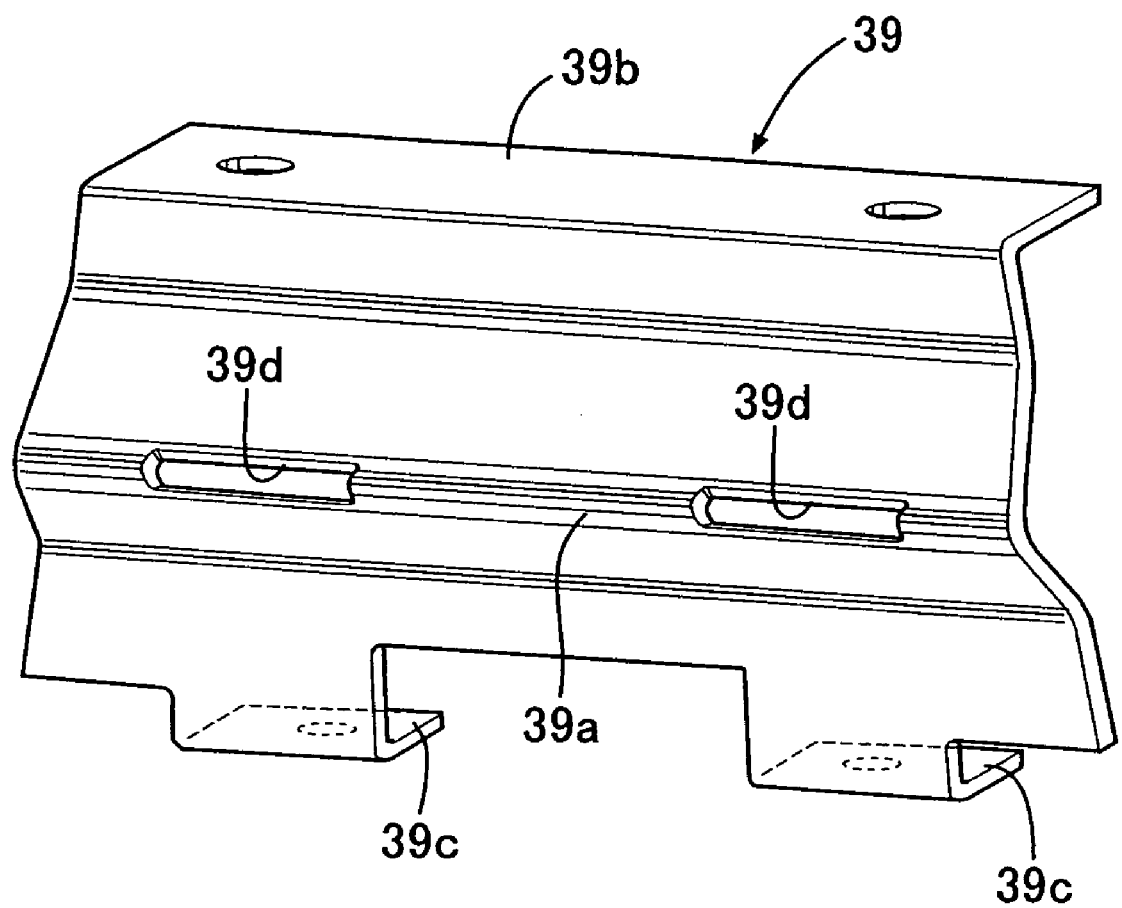
FIG. 19 is a perspective view showing the shape of a falling prevention plate according to a fifth exemplary embodiment of the present invention.

A fifth exemplary embodiment of the present invention will now be described with reference to FIG. 19.

The fifth embodiment is a modification of the fourth embodiment. In the fifth embodiment, two slits 39d, 39d are formed along a top portion of a rib 39a of a first falling prevention plate 39. With the slits 39d, 39d, the first falling prevention plate 39 can be further easily buckled by a load in a longitudinal direction of the vehicle body without substantially reducing the buckling rigidity against a diagonal load. A similar slit can be also provided in a second falling prevention plate 41.

Figure 20:
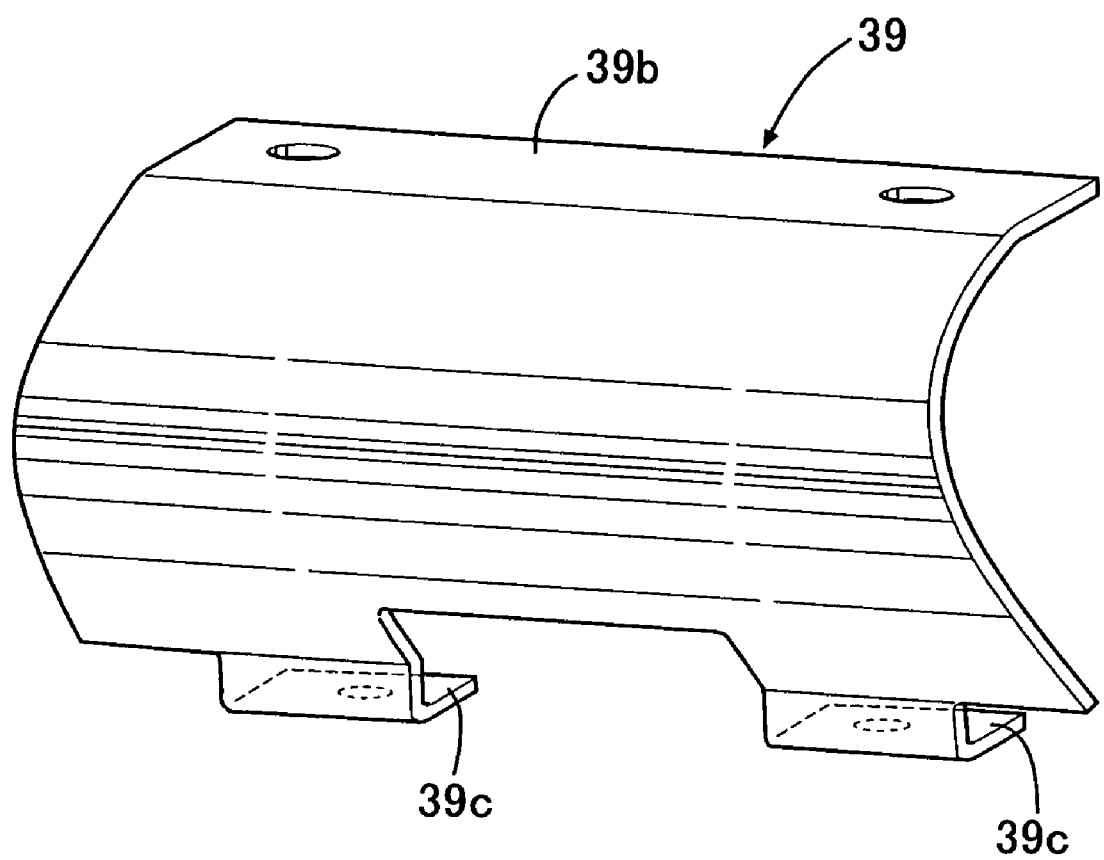
FIG. 20 is a perspective view showing the shape of a falling prevention plate according to a sixth exemplary embodiment of the present invention.

A sixth exemplary embodiment of the present invention will now be described with reference to FIG. 20.

In the fifth embodiment, the first falling prevention plate 39 includes a triangular rib 39a, but in the sixth embodiment, the entire first falling prevention plate 39 is curved into an arcuate shape. Therefore, the first falling prevention plate 39 can be easily buckled with a load in the longitudinal direction of the vehicle body, while exhibiting a strong buckling strength against a diagonal load. A second falling prevention plate 41 can be also curved into a similar arcuate shape.

A seventh exemplary embodiment of the present invention will now be described with reference to FIGS. 21, 22A and 22B.

Figure 21:
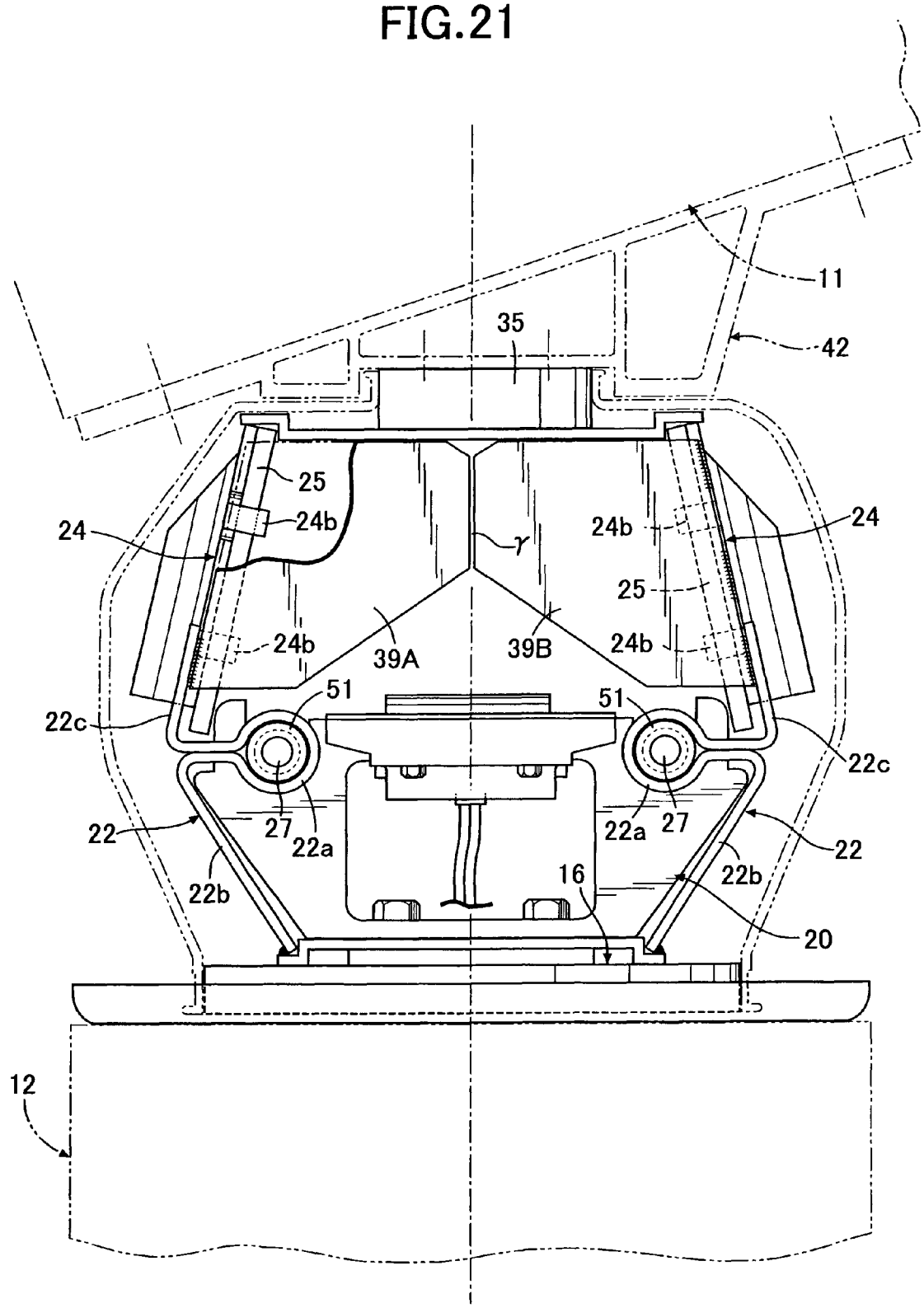
Figure 22A:
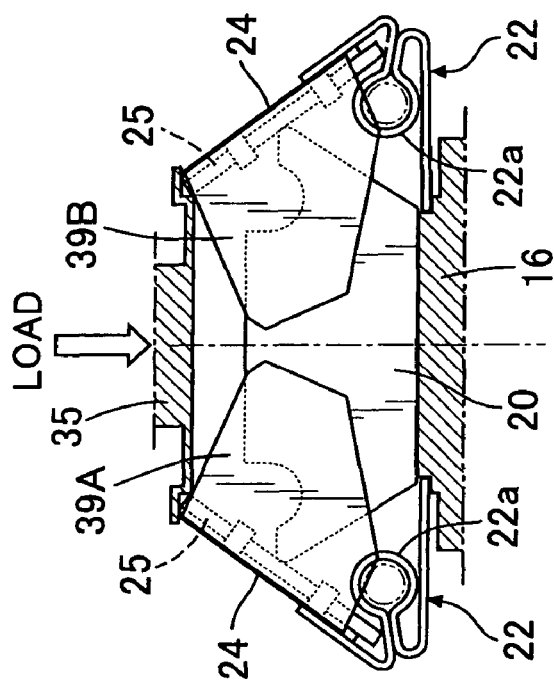

The fifth embodiment includes the first and second falling prevention plates 39 and 41 each made of a thin plate material, but the seventh embodiment includes falling prevention plates 39A and 39B made by dividing a thick plate material into two, as shown in FIG. 21. Both the falling prevention plates 39A and 39B are fixed at their laterally outer ends to a side edge of a first buckling plate 24, and have their inner ends opposed to each other with a small gap γ left therebetween.

When the first and second buckling plates 24 and 25 are buckled in the high-load mode, the falling prevention plates 39A and 39B are peeled off and separated from the first buckling plate 24. When the first and second buckling plates 24 and 25 fall down in the low-load mode, the falling prevention plates 39A and 39B are moved so as to widen the gap γ without substantially affecting the crushing of the variable crush-strength device 13 (see FIG. 22A).

Figure 22B:
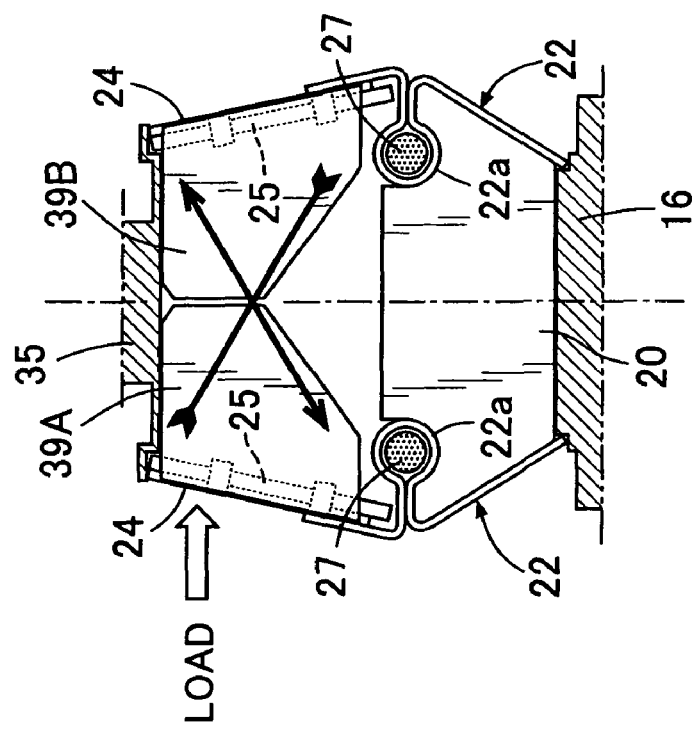

However, when a diagonal load is input to cause the right and left first and second buckling plates 24 and 25 to laterally fall down, the gap γ is diminished thereby causing the falling prevention plates 39A and 39B to abut against each other to bear a shearing force, thereby reliably preventing the lateral falling-down of the left and right first and second buckling plates 24 and 25 (see FIG. 22B).

Therefore, also the seventh embodiment achieves the same effect as those in the first, fifth and sixth embodiments.

Figure 23A:
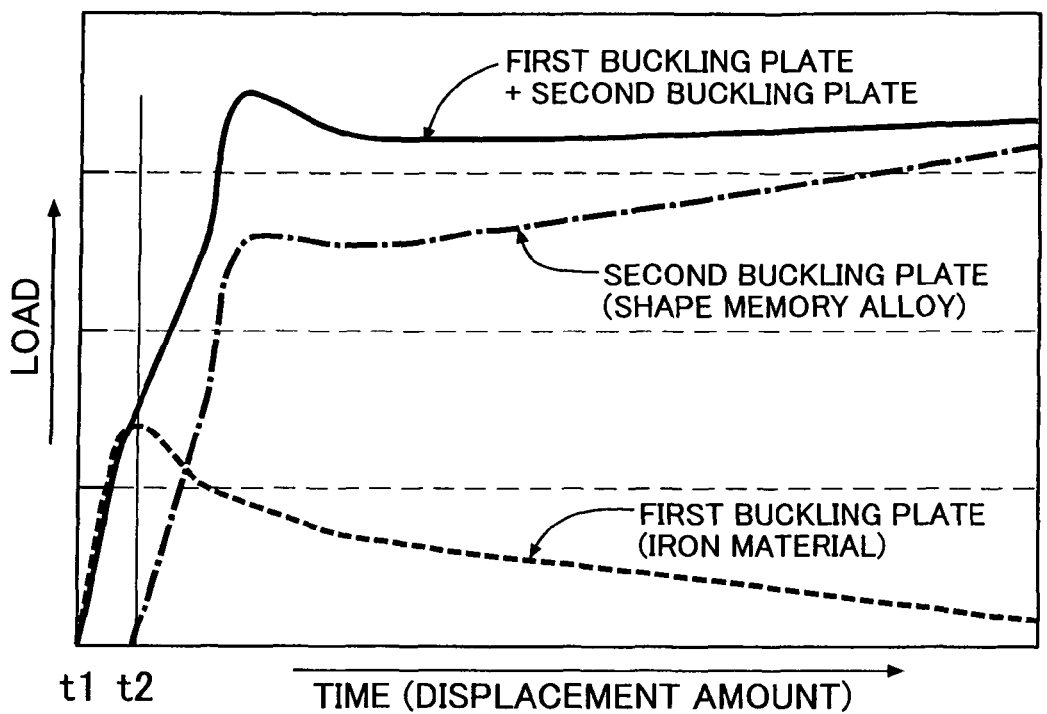
FIG. 23A is a diagram corresponding to FIG. 12, but showing the operation when the first and second buckling plates are buckled according to an eighth exemplary embodiment of the present invention.

The eighth and ninth exemplary embodiments of the present invention will now be described with reference to FIGS. 23A and 23B.

In addition to the method described with reference to FIG. 12, the characteristic of the load with respect to the displacement amount of the second buckling plate 25 can be set in various ways by changing constituents of the shape memory alloy. Also, the characteristic of the load with respect to the displacement amount of the first buckling plate 14 made of an iron material can be slightly adjusted by changing its shape.

The second buckling plate 25 made of shape memory alloy as described in FIG. 12 has the characteristic that the load steeply increases with an increase in displacement amount to reach a peak and then steeply decreases to reach a bottom, and further gradually increases from the bottom. On the other hand, the second buckling plate 25 in the eighth embodiment as shown in FIG. 23A has a characteristic that the load steeply increases with an increase in displacement amount to reach a peak and then slightly decreases, and further moderately increases. In this case, conversely to the first embodiment, the first buckling plate 24, which is made of an iron material or the like, is formed to be slightly longer than the second buckling plate 25, which is made of shape memory alloy or the like; the crushing of the first buckling plate 24 made of an iron material first starts at a time point t1; and the compression of the second buckling plate 25 later starts at a time point t2. In this manner, a characteristic (see the solid line) combining the loads on the first and second buckling plates 24 and 25 can approximate a generally constant ideal characteristic.

Figure 23B:
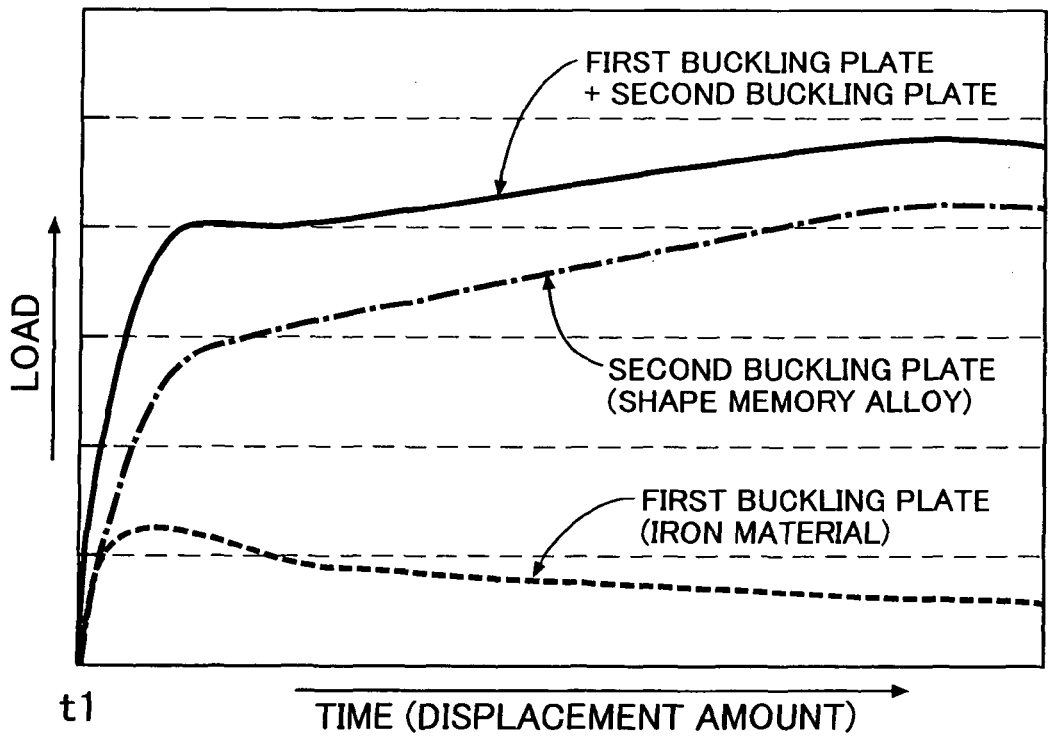
FIG. 23B is a diagram corresponding to FIG. 12, but showing the operation when the first and second buckling plates are buckled according to a ninth exemplary embodiment of the present invention.

The second buckling plate 25 in the ninth embodiment as shown in FIG. 23B has a characteristic that the load steeply increases with an increase in displacement amount, but the increasing rate is decreased so that the load is moderately increased thereafter. In this case, the first buckling plate 24, which is made of an iron material or the like, and the second buckling plate 25, whish is made of shape memory alloy or the like, are formed to have the same length, and the compressions of the first buckling plate 24 and the second buckling plate 25 simultaneously start at the time point t1. In this manner, a characteristic (see the solid line) combining the loads on the first and second buckling plates 24 and 25 can approximate a generally constant ideal characteristic.

The exemplary embodiments of the present invention have been described above, but various changes in design may be made without departing from the subject matter of the present invention.

For example, in the above exemplary embodiments, the variable crush-strength device 13 for the bumper beam 11 of the front bumper has been described, but the present invention is also applicable to a variable crush-strength device 13 for a bumper beam 11 of a rear bumper.

As another example, in the fourth embodiment, the angle δ formed by the first bolt hole 11c with respect to the direction of extension of the inclined portion 11b of the bumper beam 11 is set to be equal to the angle γ formed by the inclined portion 11b with respect to the direction of extension of the body portion 11a of the bumper beam 11, but the angle γ does not need to be equal to the angle δ.

What is claimed is:

1. A vehicle body strength adjusting system in a vehicle, comprising:
 a bumper beam including a body portion extending in a widthwise direction of a vehicle and inclined portions extending from left and right opposite ends of the body portion and inclined in a longitudinal direction of a vehicle body;

variable crush-strength devices which are disposed between the inclined portions and left and right vehicle body frames, can be crushed upon receiving a collision load in the longitudinal direction of the vehicle body, and have a variable crush-strength, wherein a first bolt hole is formed in each inclined portion of the bumper beam, a second bolt hole is formed in a mounting bracket of each variable crush-strength device, and at least one of the first bolt hole and the second bolt hole is elongate in the widthwise direction of the vehicle; and bolts which extend through the first and second bolt holes to fasten the bumper beam to the variable crush-strength devices.

2. A vehicle body strength adjusting system in a vehicle according to claim 1, wherein the first bolt hole is elongate and disposed within a horizontal plane, and an angle formed by the elongate hole with respect to a direction of extension of the body portion of the bumper beam is larger than an angle formed by the inclined portion of the bumper beam with respect to a direction of extension of the body portion.

3. A vehicle body strength adjusting system in a vehicle according to claim 2, wherein an angle formed by the elongate hole with respect to the direction of extension of the inclined portion of the bumper beam is equal to the angle formed by the inclined portion of the bumper beam with respect to the direction of extension of the body portion.

4. A vehicle body strength adjusting system according to claim 1, wherein the mounting bracket is formed by folding a plate material into an angular U-shaped bracket.

5. A vehicle body strength adjusting system in a vehicle, comprising a variable crush-strength device which is disposed between a bumper beam and a vehicle body frame, can be crushed upon receiving a collision load in the longitudinal direction of the vehicle body, and has a variable crush-strength, wherein the variable crush-strength device includes:
    a buckling plate which is buckled by a load input in the longitudinal direction of the vehicle body to absorb a shock; and
    a falling prevention plate for preventing falling-down of the buckling plate due to a load input in a direction inclined with respect to the longitudinal direction of the vehicle body.

6. A vehicle body strength adjusting system in a vehicle according to claim 5, wherein the falling prevention plate is formed so that a buckling rigidity against the load input in the direction inclined with respect to the longitudinal direction of the vehicle body is larger than a buckling rigidity against the load input in the longitudinal direction of the vehicle body.

7. A vehicle body strength adjusting system in a vehicle according to claim 5, wherein at least one slit is formed along a top portion of a rib of the falling prevention plate.

8. A vehicle body strength adjusting system in a vehicle according to claim 5, wherein the falling prevention plate is curved into an arcuate shape.

9. A vehicle body strength adjusting system in a vehicle according to claim 5, wherein the first and second buckling plates are formed such that during a collision a sum of the loads on the buckling plates is maintained at a substantially constant value.

10. A vehicle body strength adjusting system in a vehicle according to claim 9, wherein the second buckling plate is formed such that the load thereon increases with an increase in displacement amount in a region excluding an initial stage of deformation and the first buckling plate is formed such that the load thereon decreases with an increase in displacement amount in the region excluding the initial stage of deformation, such that the sum of the loads on the first and second buckling plates is maintained at the substantially constant value.

11. A vehicle body strength adjusting system in a vehicle, comprising a variable crush-strength device which is disposed between a bumper beam and a vehicle body frame, can be crushed upon receiving a collision load in the longitudinal direction of the vehicle body, and has a variable crush-strength, wherein the variable crush-strength device includes a first buckling plate and a second buckling plate which are superposed on each other such that they are integrally buckled by the collision load; and wherein the second buckling plate is formed of shape memory alloy, and the first buckling plate is formed of a material other than shape memory alloy.

12. A vehicle body strength adjusting system in a vehicle according to claim 11, wherein the first and second buckling plates have different lengths in the longitudinal direction of the vehicle body.

13. A vehicle body strength adjusting system in a vehicle according to claim 11, wherein the second buckling plate is integrally fixed to the first buckling plate by folding a fixing claw formed on the first buckling plate.

14. A vehicle body strength adjusting system in a vehicle according to claim 12, wherein the second buckling plate is integrally fixed to the first buckling plate by folding a fixing claw formed on the first buckling plate.

15. A vehicle body strength adjusting system in a vehicle according to claim 11, wherein the first and second buckling plates are formed such that during a collision a sum of the loads on the buckling plates is maintained at a substantially constant value.

16. A vehicle body strength adjusting system in a vehicle according to claim 15, wherein the second buckling plate is formed such that the load thereon increases with an increase in displacement amount in a region excluding an initial stage of deformation and the first buckling plate is formed such that the load thereon decreases with an increase in displacement amount in the region excluding the initial stage of deformation, such that the sum of the loads on the first and second buckling plates is maintained at the substantially constant value.

17. A vehicle body strength adjusting system in a vehicle according to claim 11, wherein said material other than shape memory allow is an iron based material.

* * * * *